(12) United States Patent
Lim

(10) Patent No.: US 9,547,197 B2
(45) Date of Patent: Jan. 17, 2017

(54) FABRICATION METHOD OF DISPLAY DEVICE AND DISPLAY DEVICE

(71) Applicant: Samsung Display Co., Ltd., Yongin-si, Gyeonggi-Do (KR)

(72) Inventor: Ho Lim, Suwon-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/656,076

(22) Filed: Mar. 12, 2015

(65) Prior Publication Data

US 2016/0026041 A1 Jan. 28, 2016

(30) Foreign Application Priority Data

Jul. 25, 2014 (KR) .......................... 10-2014-0094483

(51) Int. Cl.
*B05D 3/00* (2006.01)
*G02F 1/1337* (2006.01)
(Continued)

(52) U.S. Cl.
CPC ....... *G02F 1/133711* (2013.01); *C09K 19/348* (2013.01); *C09K 19/56* (2013.01);
(Continued)

(58) Field of Classification Search
CPC ............ G06F 1/13378; G06F 1/133788; G06F 1/133711; G06F 1/13439; G06F 1/133703; G06F 2001/133726; C09K 19/56; C09K 2019/0448; C09K 2019/122; C09K 2019/2042; Y10T 428/10; Y10T 428/1005; Y10T 428/1023
(Continued)

(56) References Cited

U.S. PATENT DOCUMENTS

| 8,226,860 B2 | 7/2012 | Zheng et al. |
| 2011/0025967 A1 | 2/2011 | Sohn et al. |

(Continued)

FOREIGN PATENT DOCUMENTS

| KR | 10-2010-0015906 A | 2/2010 |
| KR | 10-2012-0099652 A | 9/2012 |

(Continued)

*Primary Examiner* — Ruiyun Zhang
(74) *Attorney, Agent, or Firm* — Robert E. Bushnell, Esq.

(57) ABSTRACT

Provided is a fabrication method of a display device. The method includes providing an alignment solution on at least one of a first substrate and a second substrate, curing the alignment solution to form a main alignment layer, and providing a liquid crystal composition including liquid crystal molecules to form a liquid crystal layer between the first substrate and the second substrate. The alignment solution or the liquid crystal composition includes a reactive mesogen represented by the following Formula 1.

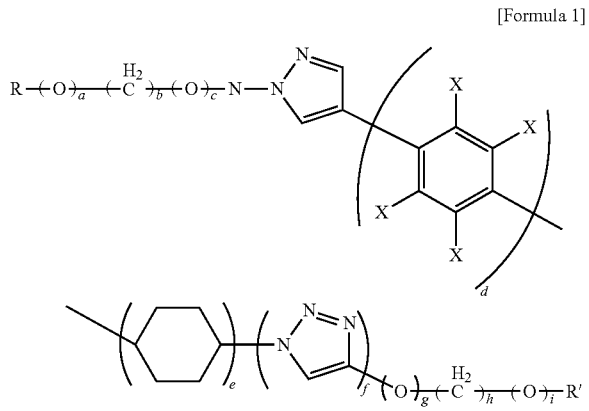

28 Claims, 12 Drawing Sheets

(51) Int. Cl.
*C09K 19/56* (2006.01)
*C09K 19/34* (2006.01)
C09K 19/04 (2006.01)
G02F 1/1333 (2006.01)

(52) U.S. Cl.
CPC ............... *G02F 1/133788* (2013.01); *C09K 2019/0448* (2013.01); *G02F 2001/133397* (2013.01); *G02F 2001/133715* (2013.01); *G02F 2001/133726* (2013.01); *Y10T 428/1005* (2015.01)

(58) Field of Classification Search
USPC ... 428/1.1, 1.2; 349/123, 127, 129; 427/532, 427/551, 553, 558, 162, 508; 445/25
See application file for complete search history.

(56) References Cited

U.S. PATENT DOCUMENTS

| | | | |
|---|---|---|---|
| 2011/0032465 A1 | 2/2011 | Seong et al. | |
| 2012/0229744 A1* | 9/2012 | Hattori | C08F 2/50 349/124 |
| 2013/0182202 A1 | 7/2013 | Graziano et al. | |

FOREIGN PATENT DOCUMENTS

| | | |
|---|---|---|
| KR | 1020150078514 A | 7/2015 |
| KR | 1020150078515 A | 7/2015 |
| KR | 1020150083695 A | 7/2015 |

* cited by examiner

FABRICATION METHOD OF DISPLAY DEVICE AND DISPLAY DEVICE

CLAIM OF PRIORITY

This U.S. non-provisional patent application claims priority under 35 U.S.C. §119 to Korean Patent Application No. 10-2014-0094483, filed in the Korean Intellectual Property Office on Jul. 25, 2014, the entire contents of which are hereby incorporated by reference.

BACKGROUND OF THE INVENTION

The present disclosure relates to a fabrication method of a display device and an associated display device, and, more particularly, to a fabrication method of a display device including an alignment layer and a corresponding display device.

Generally, many liquid crystal display devices may be classified as twisted nematic mode liquid crystal display devices, in-plane switching mode liquid crystal display devices, or vertical alignment mode liquid crystal display devices.

In the vertical alignment mode liquid crystal device, liquid crystals are aligned in a certain direction when an electric field is not applied, the longitudinal axis of the liquid crystal molecules being vertically aligned (aligned perpendicular) with respect to a substrate. This forms a black display between crossed polarizers. When an electric field is applied, the liquid crystals assume an alternative, tilted position relative to the substrate. Light from a backlight or reflector may then pass through the substrates, the intensity of transmitted light depending on the degree of tilt in the liquid crystal long axis with respect to the substrates. Thus, viewing angles are wide, and contrast ratio is high in a vertical alignment mode liquid crystal display device.

Methods for aligning the liquid crystal molecules in a certain direction include a rubbing method, a photo-alignment method, and the like. In the vertical alignment mode liquid crystal display device, the liquid crystal molecules may be aligned in a certain direction by using reactive mesogens according to one of the photo-alignment methods.

SUMMARY OF THE INVENTION

The present disclosure provides a fabrication method of a display device having high reliability.

The present disclosure also provides a display device having high reliability.

Embodiments of the inventive concept provide fabrication methods of a display device including providing a first substrate and a second substrate, providing an alignment solution, coating the alignment solution on at least one of the first substrate and the second substrate, curing the alignment solution to form a main alignment layer, providing a liquid crystal composition including liquid crystal molecules, and using the liquid crystal composition to form a liquid crystal layer between the first substrate and the second substrate. The alignment solution or the liquid crystal composition includes a reactive mesogen represented by the following Formula 1.

[Formula 1]

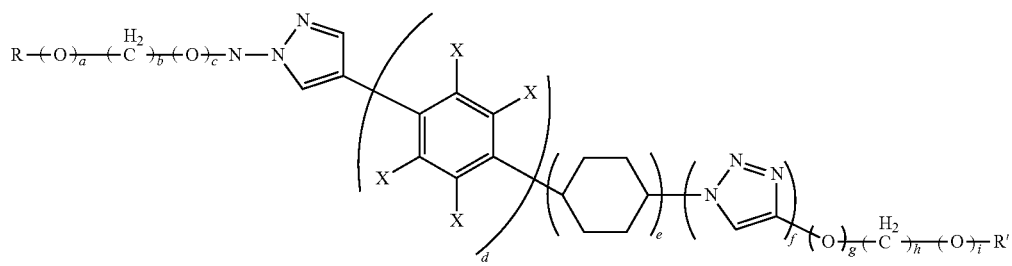

where b and h are independently an integer from 1 to 20, a, c, e, f, g, and i are independently an integer of 0 or 1, and d is an integer from 1 to 3, X is a substituent selected from the group consisting of H, $CH_3$, $(CH_2)_p CH_3$ (where p is an integer from 1 to 20), F, Br, I, OH, $C_3H_7$, $NH_2$ and CN, R and R' are each independently a substituent selected from the group consisting of substituents represented in the following Formula 2:

[Formula 2]

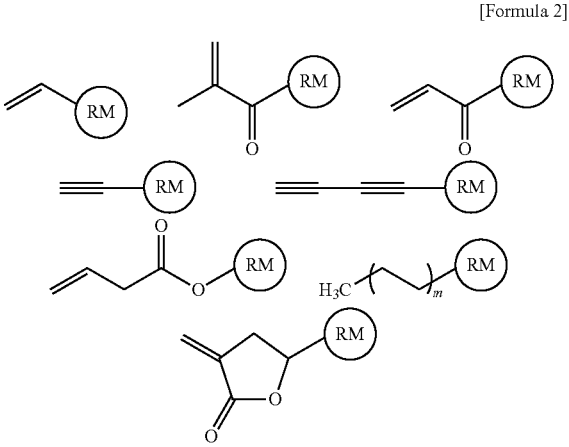

where m is an integer from 1 to 20, and ⓡᴹ denotes an attachment point for a remainder of the reactive mesogen.

In some embodiments in which the alignment solution includes the reactive mesogen, the fabrication method according to an embodiment of the inventive concept may further include applying heat to the main alignment layer and the liquid crystal layer to elute the reactive mesogen in the main alignment layer to the liquid crystal layer, and providing the liquid crystal layer with light to perform reaction of the reactive mesogen to form an alignment forming layer.

In other embodiments, the curing of the alignment solution to form the main alignment layer may further include pre-curing the alignment solution at a first temperature and main curing the pre-cured alignment solution at a second temperature that is higher than the first temperature.

0.01 to about 10 wt % based on an amount of the liquid crystal composition.

In other embodiments of the inventive concept, display devices may include a first substrate, a second substrate, a liquid crystal layer, a first alignment layer, and a second alignment layer. The second substrate may face the first substrate. The liquid crystal layer may be formed between the first substrate and the second substrate. The first alignment layer may be formed between the first substrate and the liquid crystal layer. The second alignment layer may be formed between the second substrate and the liquid crystal layer. At least one of the first alignment layer and the second alignment layer may include polymerized reactive mesogen. The reactive mesogen may be represented by the following Formula 1.

[Formula 1]

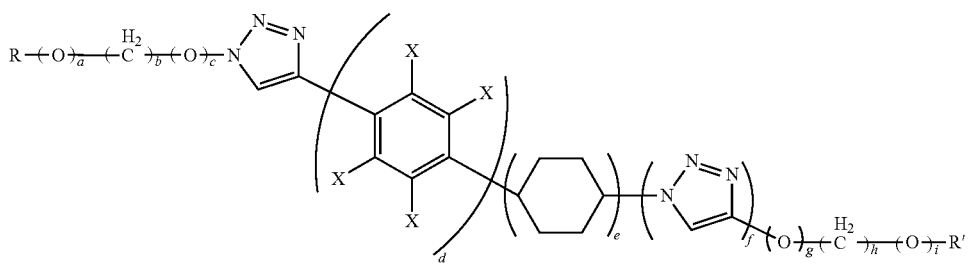

In still other embodiments, the alignment solution may include a solvent and a solid content, and the solid content may include an alignment agent for forming the main alignment layer and the reactive mesogen for forming the alignment forming layer. The reactive mesogen may be included in an amount ratio from about 1 to about 30 wt % based on an amount of the solid content.

In other embodiments, the step of using the liquid crystal composition to form a liquid crystal layer may further include providing the liquid crystal composition on at least one of the first substrate and the second substrate, providing an encapsulating solution on at least one of the first substrate and the second substrate, facing the first substrate and the second substrate with the liquid crystal composition therebetween, and curing the encapsulating solution.

In yet other embodiments, the eluting of the reactive mesogen into the liquid crystal layer and the curing of the encapsulating solution may be a single step.

In further embodiments, the curing of the alignment solution to form the main alignment layer may include forming a main alignment layer including a plurality of side chains.

In still further embodiments, in the case that the liquid crystal composition includes the reactive mesogen, the fabrication method according to an embodiment of the inventive concept may further include providing light to perform reaction between at least a portion of the side chains with the reactive mesogen to connect the at least a portion of the side chains to each other through the reactive mesogen.

In even further embodiments, the fabrication method of a display device according to an embodiment of the inventive concept may further include exposing the liquid crystal layer to a first light while applying an electric field to the liquid crystal layer, removing the electric field, and exposing the liquid crystal layer to a second light.

In yet further embodiments in which the liquid crystal composition comprises the reactive mesogen, the reactive mesogen may be included in an amount ratio from about where b and h are independently an integer from 1 to 20, a, c, e, f, g, and i are independently an integer of 0 or 1, and d is an integer from 1 to 3, X is a substituent selected from the group consisting of H, $CH_3$, $(CH_2)_p CH_3$ (where p is an integer from 1 to 20), F, Br, I, OH, $C_3H_7$, $NH_2$ and CN, R and R' are each independently a substituent selected from the group consisting of substituents represented in the following Formula 2:

[Formula 2]

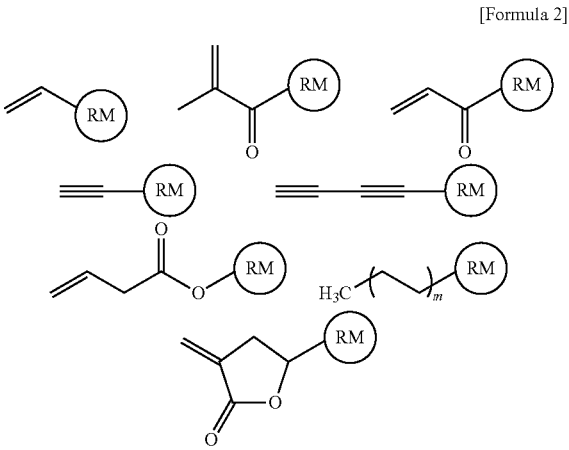

where m is an integer from 1 to 20, and denotes an attachment point for a remainder of the reactive mesogen.

In some embodiments, the first alignment layer may include a first main alignment layer, and a first alignment forming layer formed on the first main alignment layer. The second alignment layer may include a second main alignment layer, and a second alignment forming layer formed on the second main alignment layer. Each of the first alignment forming layer and the second alignment forming layer may include polymerized reactive mesogen.

In other embodiments, the first alignment layer may include a first main alignment layer, which may include a plurality of first side chains. The second alignment layer may include a second main alignment layer, which may include a plurality of second side chains. At least a portion of the first side chains may be connected to each other by the reactive mesogen and at least of a portion of the second side chains may be connected to each other by the reactive mesogen.

In still other embodiments, each of the first side chains and the second side chains may include a vertically aligning diamine.

In even other embodiments, the display device according to an embodiment of the inventive concept may further include pixels forming images. Each of the pixels may include a thin film transistor, a pixel electrode electrically connected to the thin film transistor, and a common electrode facing the pixel electrode.

In yet other embodiments, the pixel electrode may include a stem part, and a plurality of branch parts extruded and extended from the stem part.

In further embodiments, the pixels may further include respectively disposed pixel areas, and each of the pixel areas may further include a plurality of domains. The plurality of the domains may be divided by the stem part.

In still further embodiments, the plurality of the branch parts may be extended in parallel to each other in each of the plurality of the domains, and each of the plurality of the domains may be extended in different directions from each other.

In other embodiments, the fabrication method of a display device according to the present invention may comprise providing a first substrate and a second substrate, providing an alignment solution, coating the alignment solution on at least one of the first substrate and the second substrate, curing the alignment solution to form a main alignment layer, providing a liquid crystal composition comprising liquid crystal molecules and a reactive mesogen, and using the liquid crystal composition to form a liquid crystal layer between the first substrate and the second substrate, the reactive mesogen being represented by the following Formula 1:

[Formula 2]

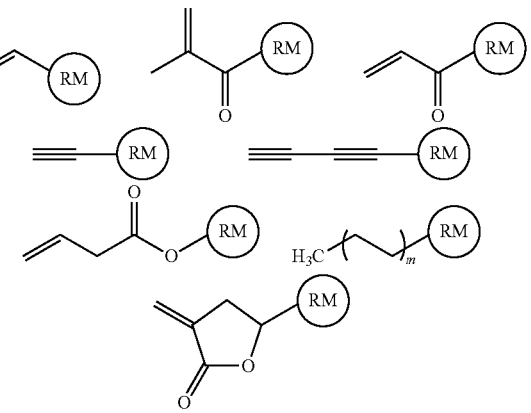

where m is an integer from 1 to 20, and ⓡᴹ denotes an attachment point for a remainder of the reactive mesogen.

In some embodiments, the alignment solution may comprise a vertically aligning diamine, and the fabrication method according to the present invention may further include providing the liquid crystal layer with light to induce reaction of the reactive mesogen to form an alignment forming layer.

According to a fabrication method of a display device according to an embodiment of the inventive concept, a display device having high reliability may be fabricated.

According to a display device according to an embodiment of the inventive concept, reliability may be increased.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

[Formula 1]

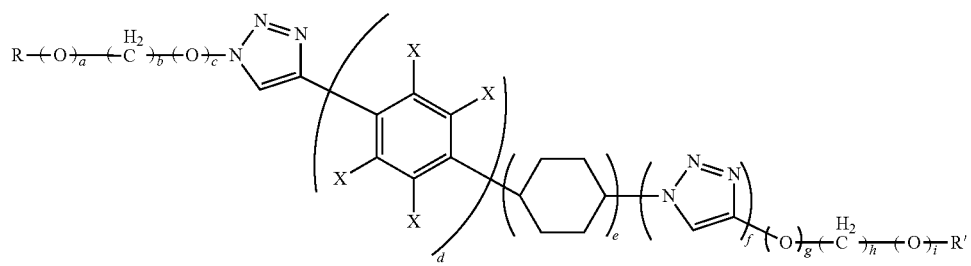

Figure 2:
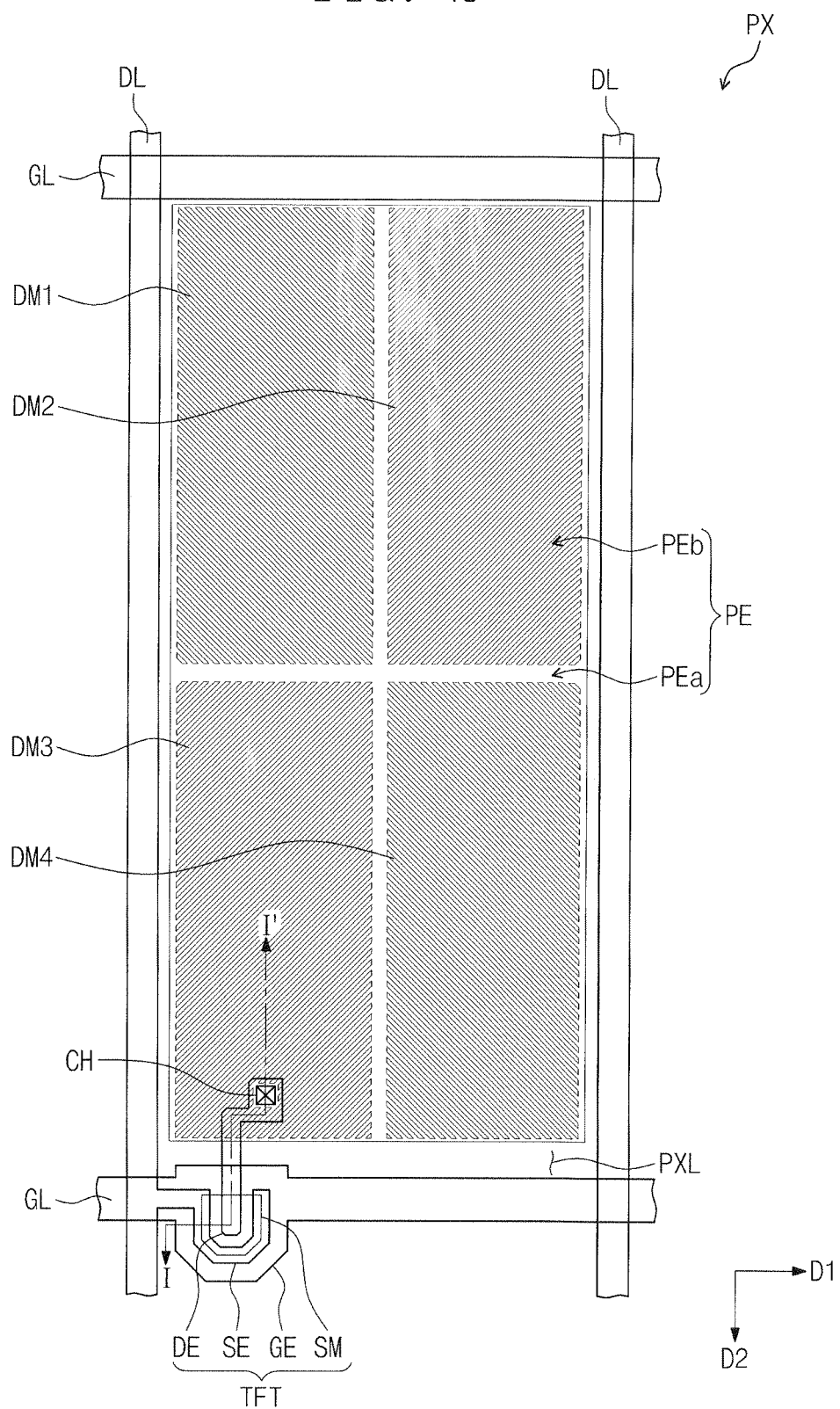
Figure 3:
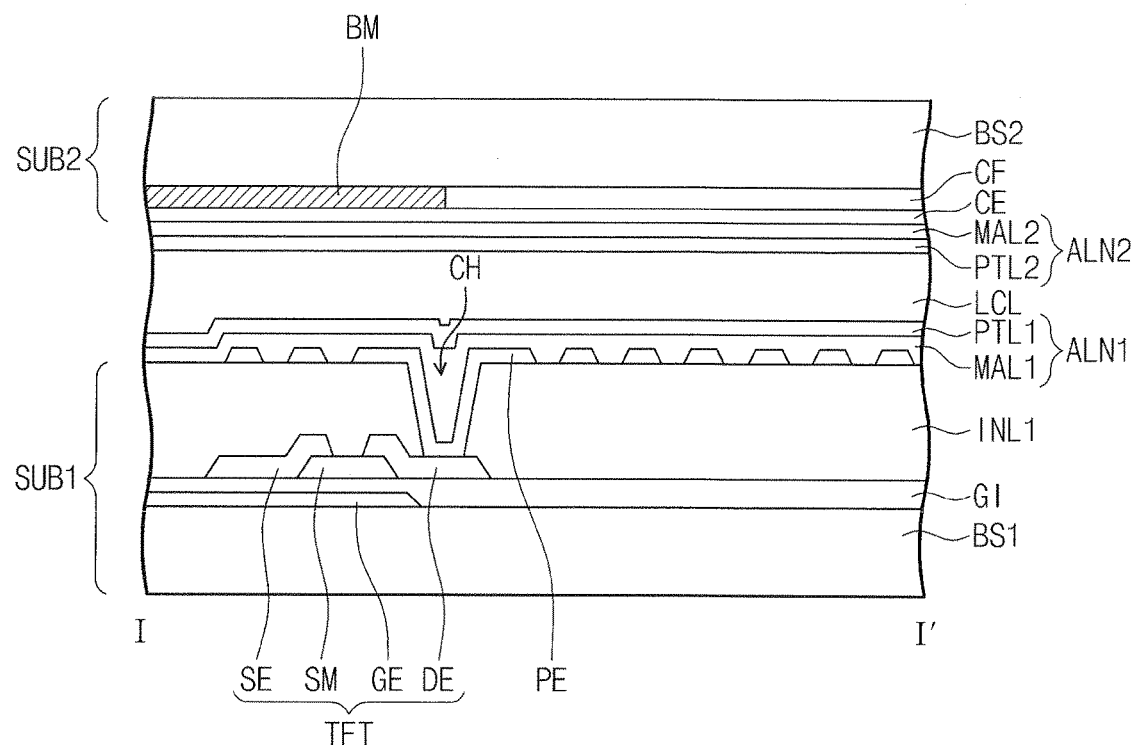
Figure 4:
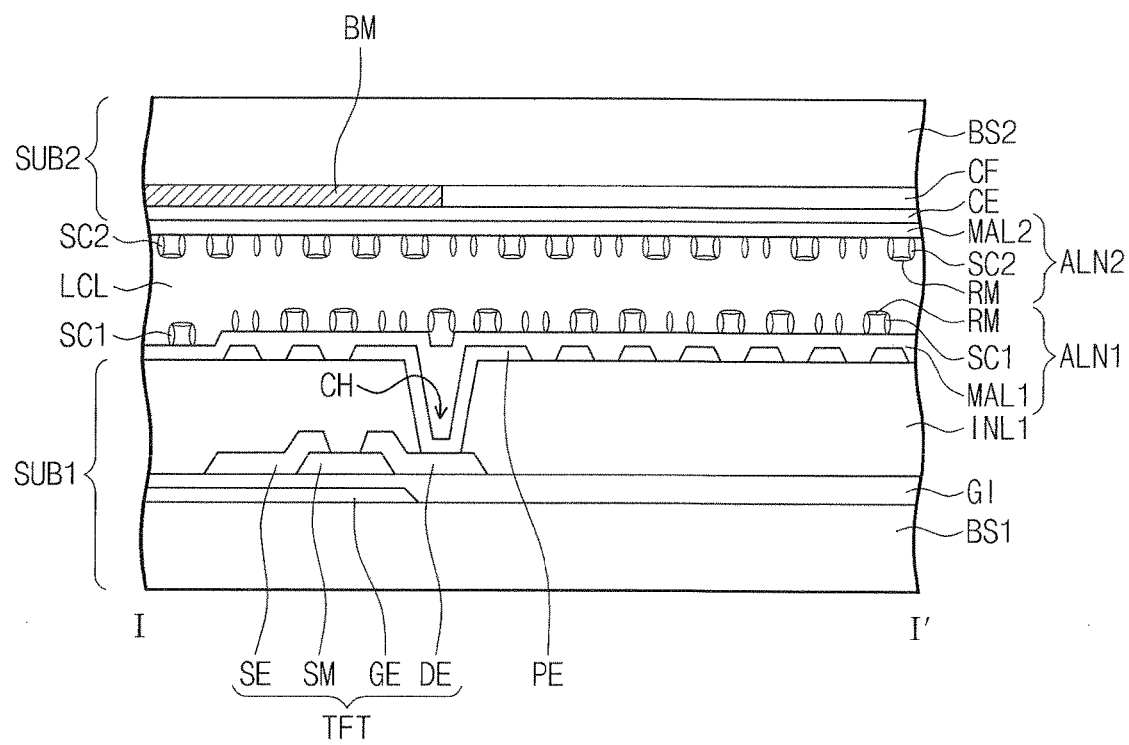
Figure 5:
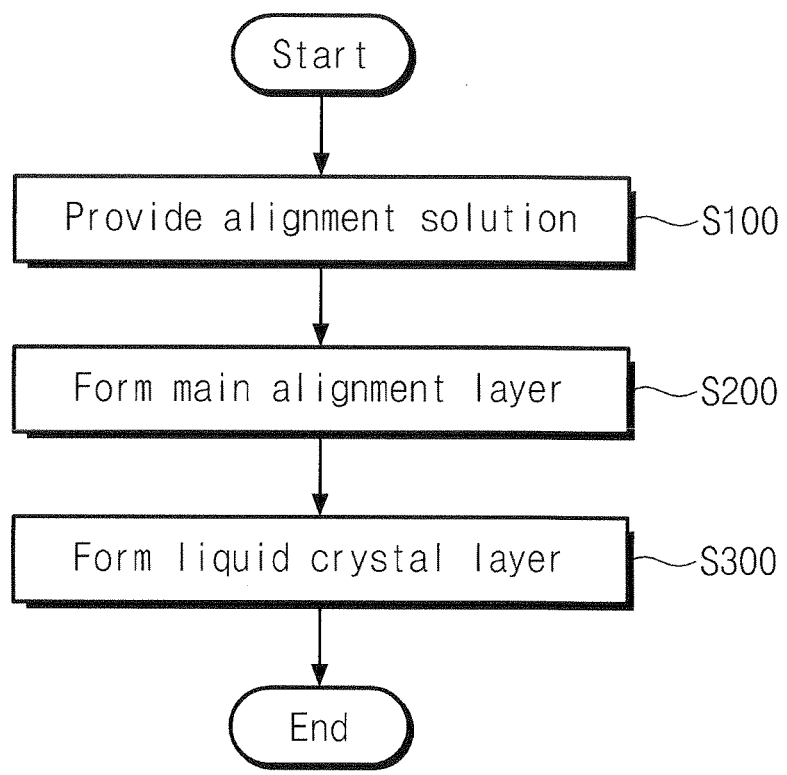
Figure 6A:
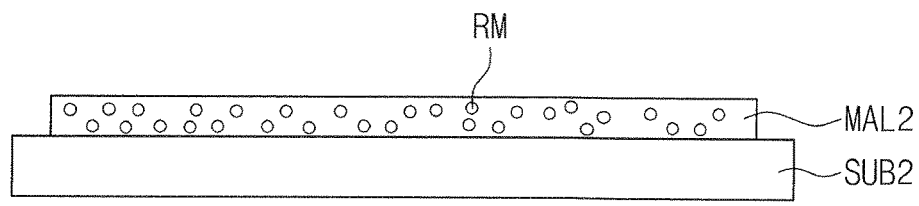
Figure 6A:
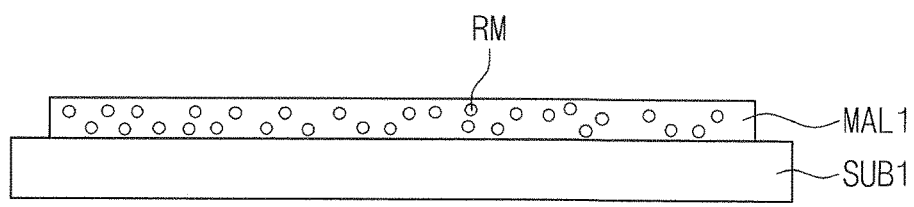
Figure 6B:
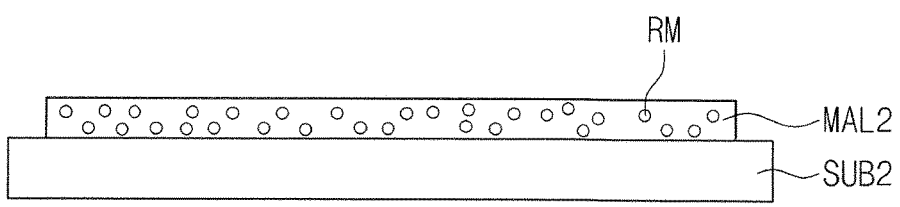
Figure 6B:
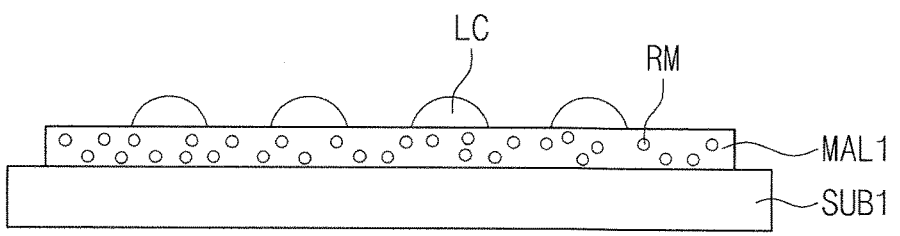
Figure 6C:
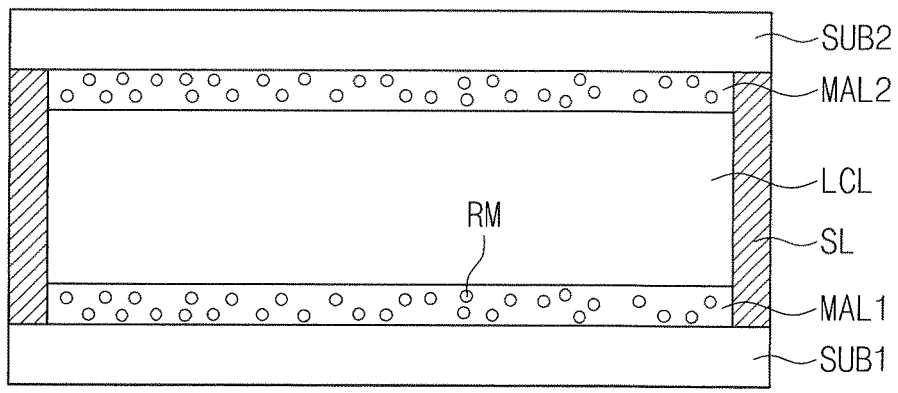
Figure 6D:
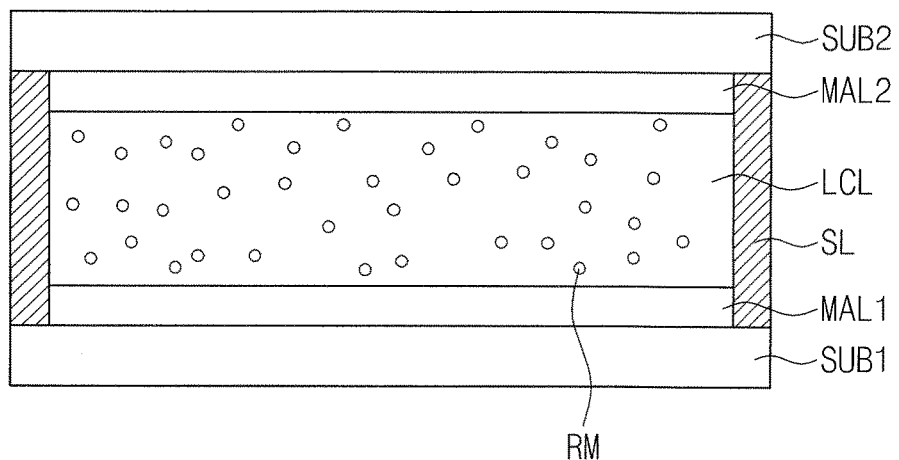
Figure 6E:
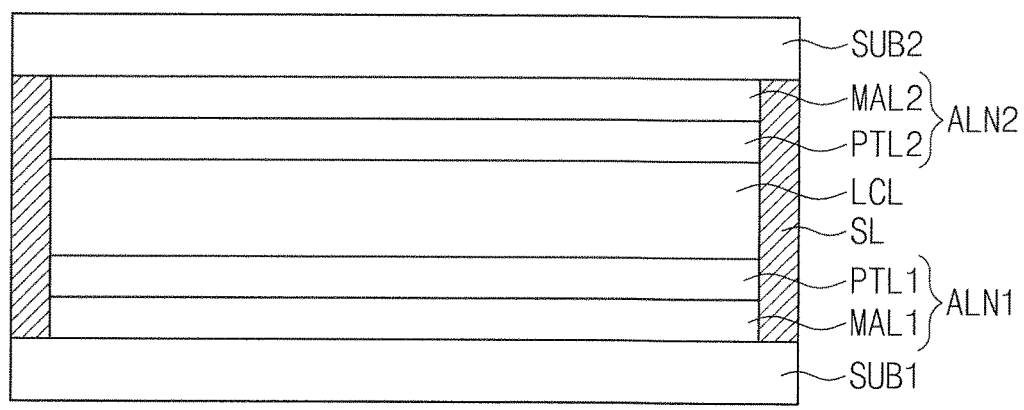
Figure 7:
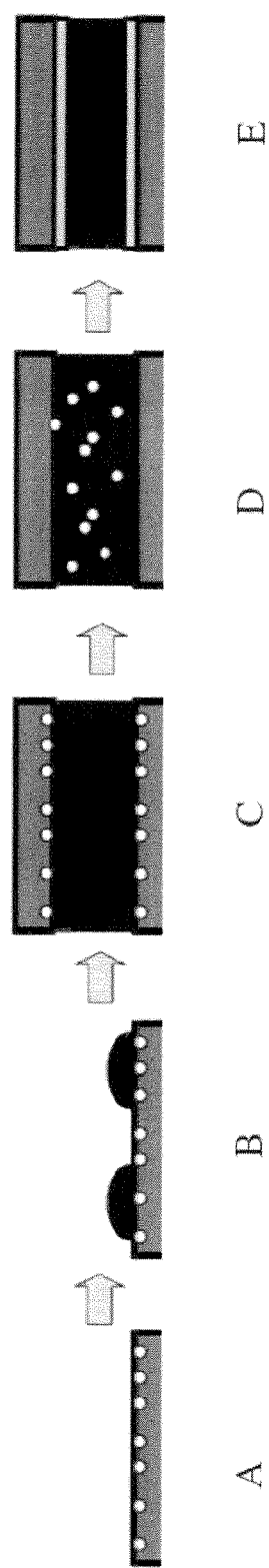

where b and h are independently an integer from 1 to 20, a, c, e, f, g, and i are independently an integer of 0 or 1, and d is an integer from 1 to 3, X is a substituent selected from the group consisting of H, $CH_3$, $(CH_2)_pCH_3$ (where p is an integer from 1 to 20), F, Br, I, OH, $C_3H_7$, $NH_2$ and CN, R and R' are each independently a substituent selected from the group consisting of substituents represented in the following Formula 2:

FIG. 2 is a plan view schematically illustrating one of pixels included in a display device according to an embodiment of the inventive concept;

FIG. 3 is a schematic cross-sectional view corresponding to line I-I' in FIG. 2;

FIG. 4 is a schematic cross-sectional view corresponding to line I-I' in FIG. 2, further illustrating some details of liquid crystal alignment;

FIG. 5 is a flowchart schematically illustrating a fabrication method of a display device according to an embodiment of the inventive concept;

FIGS. 6A to 6E are schematic cross-sectional views illustrating a fabrication method of a display device according to an embodiment of the inventive concept, shown in chronological order; and FIG. 7 illustrates a fabrication method according to some embodiments of the present invention.

FIGS. 8A to 8D are schematic cross-sectional views illustrating a fabrication method of a display device according to an embodiment of the inventive concept, shown in chronological order.

Figure 9:
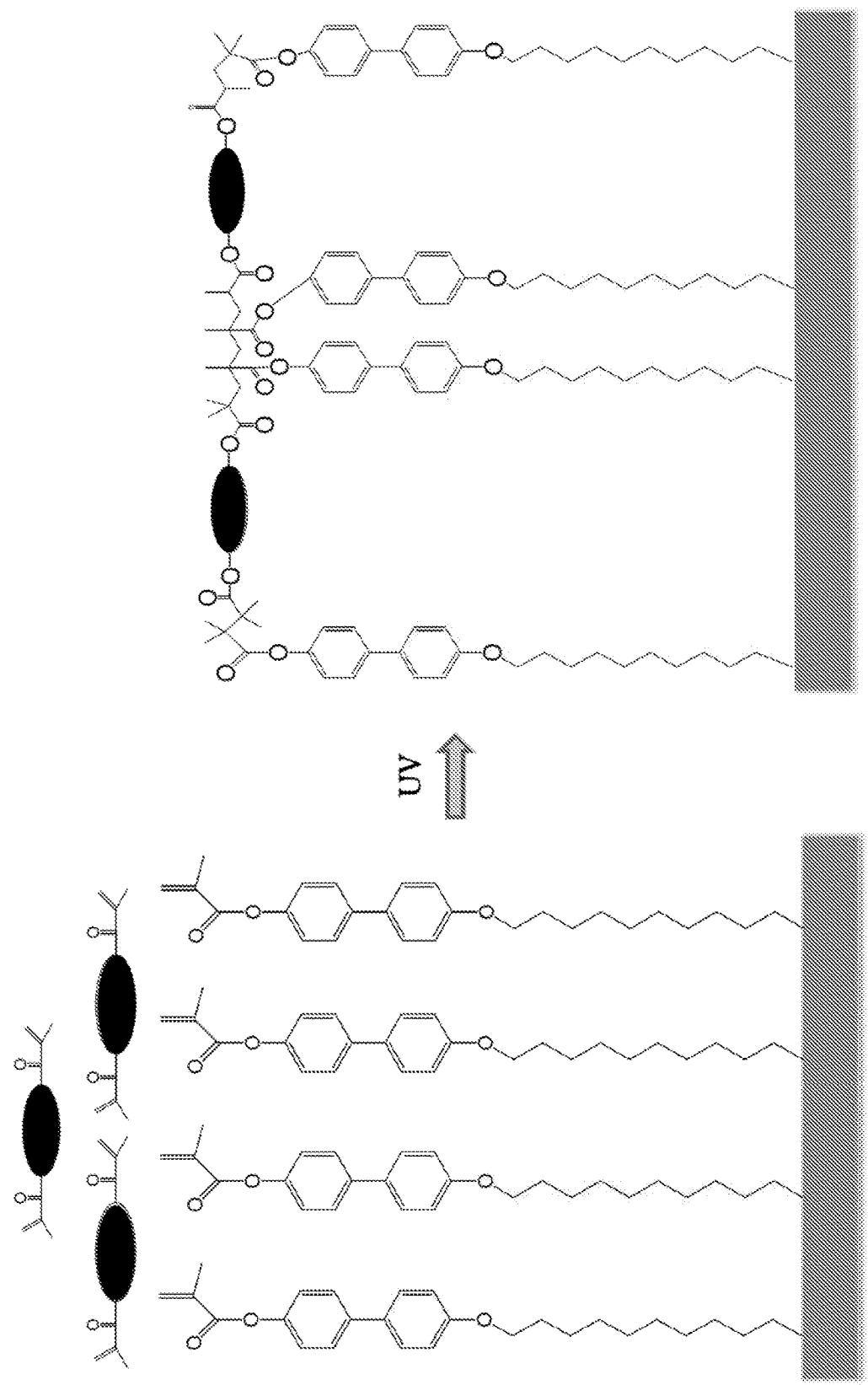

FIG. 9 illustrates the connection of side chains on the surfaces of alignment layers to each other by photochemical reactions, either directly or via an intervening reactive mesogen molecule.

DETAILED DESCRIPTION OF THE EMBODIMENTS

The advantages and features of the inventive concept and methods for attaining them will be described in example embodiments below with reference to the accompanying drawings. The inventive concept may, however, be embodied in different forms and should not be construed as limited to the embodiments set forth herein. Rather, these embodiments are provided so that this description will be thorough and complete, and will fully convey the scope of the present inventive concept to those skilled in the art.

In the drawings, like reference numerals refer to like elements throughout. The dimensions of layers and regions are exaggerated for clarity of illustration. It will be understood that, although the terms first, second, etc., may be used herein to describe various elements, the elements of the present invention should not be limited by these terms. These terms are used only to distinguish one element from another element. Thus, a first element could be termed a second element, and, similarly, a second element could be termed a first element within the scope of the inventive concept. As used herein, the singular forms "a," "an" and "the" are intended to include the plural forms as well, unless the context clearly indicates otherwise.

It will be further understood that the terms "comprises" and/or "comprising," when used in this specification, specify the presence of stated features, numerals, steps, operations, and/or devices, but do not preclude the presence or addition of one or more other features, numerals, steps, operations, and/or devices thereof. It will also be understood that when a layer, a film, an area, a plate, etc., is referred to as being 'on' another layer or substrate, it can be directly on the other layer or substrate, or intervening layers may also be present. It will also be understood that when a layer, a film, an area, a plate, etc., is referred to as being 'under' another layer or substrate, it can be directly under the other layer or substrate, or intervening layers may also be present.

Hereinafter, exemplary embodiments of the inventive concept will be described in detail with reference to the accompanying drawings.

Figure 1:
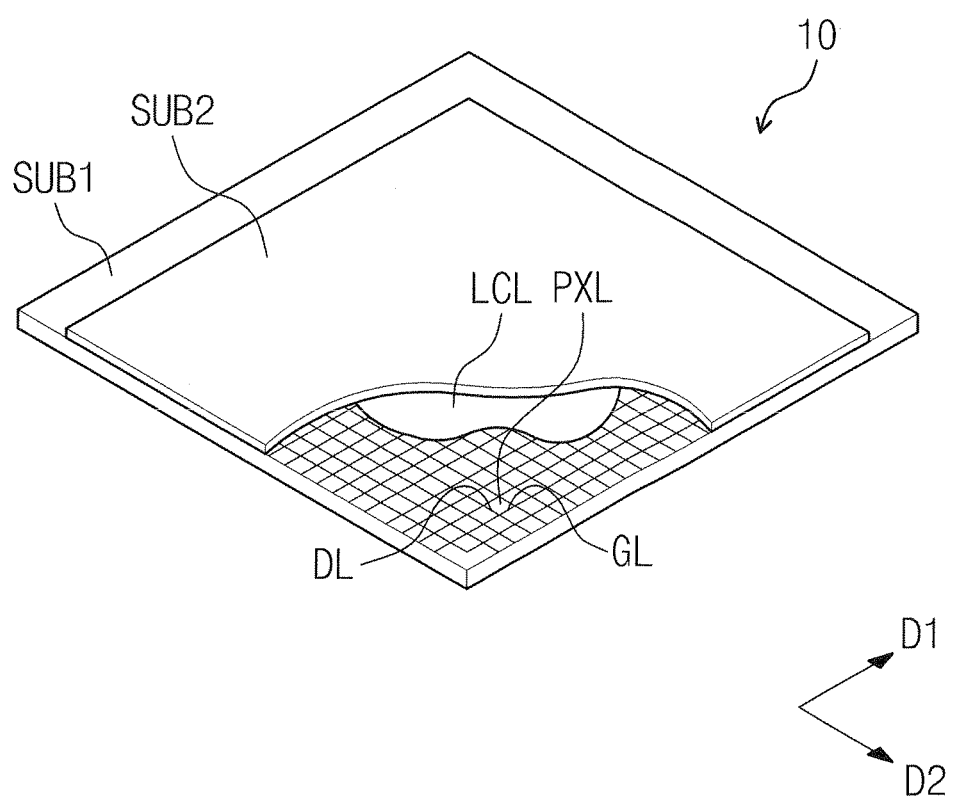
FIG. 1 is a schematic perspective view of a display device according to an embodiment of the inventive concept.

FIG. 1 is a schematic perspective view of a display device according to an embodiment of the inventive concept.

FIG. 2 is a plan view schematically illustrating one of pixels included in a display device according to an embodiment of the inventive concept.

FIG. 3 is a schematic cross-sectional view corresponding to line I-I' in FIG. 2.

Referring to FIGS. 1 to 3, a display device 10 includes a first substrate SUB1, a second substrate SUB2, a liquid crystal layer LCL, a first alignment layer ALN1, and a second alignment layer ALN2.

The first substrate SUB1 may include a first base substrate BS1, a plurality of gate lines GL, and a plurality of data lines DL.

The first base substrate BS1 may be a transparent insulating substrate and may be formed by using silicon, glass, or plastic.

Gate lines GL are formed on the first base substrate BS1. The gate lines GL may be extended in a first direction (for example, D1 direction in FIG. 1) and formed.

Data lines DL may be extended and formed in a second direction (for example, D2 direction in FIG. 1, shown perpendicular to D1, though it is not limited thereto), which crosses the first direction (for example, D1 direction in FIG. 1) and may be separated from the gate lines GL with a gate insulating layer GI therebetween.

The first substrate SUB1 may include pixel areas PXL. In the pixel areas PXL, a plurality of pixels PX may be disposed, respectively. Each of the pixels PX may be connected to one of the gate lines GL and one of the data lines DL. Each of the pixels PX may be connected to a plurality of gate lines GL and a plurality of data lines DL, however the inventive concept is not limited thereto.

Each of the pixel areas PXL may include a plurality of domains DM, including, for example, DM1, DM2, DM3 and DM4. Each of the pixels PX may include a thin film transistor TFT, a pixel electrode PE electrically connected to the thin film transistor TFT, and a common electrode CE facing the pixel electrode PE. The thin film transistor TFT may include a gate electrode GE, a patterned semiconductor SM, a source electrode SE and a drain electrode DE, and may apply a data voltage to the pixel electrode PE.

The gate electrode GE may be formed on the first base substrate BS1. The gate electrode GE may be in electrical contact with at least a portion of the gate lines GL.

The gate electrode GE may be formed by using a metal. The gate electrode GE may be formed by using a metal selected from nickel, chromium, molybdenum, aluminum, titanium, copper, tungsten, and alloys thereof. The gate electrode GE may be formed as a single layer or as multiple layers using a metal. For example, the gate electrode GE may be a triple layer composite obtained by subsequently stacking molybdenum, aluminum and molybdenum, or a double layer composite obtained by subsequently stacking titanium and copper. Alternatively, the gate electrode GE may be a single layer formed by using an alloy of titanium and copper.

The gate insulating layer GI may be formed on the gate electrode GE and may cover the gate electrode GE. The gate insulating layer GI may be formed by using an organic insulating material or an inorganic insulating material.

A semiconductor pattern SM may be formed on the gate insulating layer GI. The semiconductor pattern SM may face the gate electrode GE with the gate insulating layer GI therebetween. The semiconductor pattern SM is partially overlapped with the gate electrode GE.

The source electrode SE may be branched from at least a portion of the data lines DL and deposited on the gate insulating layer GI. At least a portion of the source electrode SE may be formed on the semiconductor pattern SM. At least a portion of the source electrode SE may be overlapped with each of the semiconductor pattern SM and the gate electrode GE.

The drain electrode DE is deposited separately on the gate insulating layer GI, separated from the source electrode SE by the semiconductor pattern SM therebetween. At least a portion of the drain electrode DE may be formed on the semiconductor pattern SM. At least a portion of the drain electrode DE may be overlapped with each of the semiconductor pattern SM and the gate electrode GE.

Each of the source electrode SE and the drain electrode DE may be formed by using a metal selected from nickel, chromium, molybdenum, aluminum, titanium, copper, tungsten and alloys thereof. Each of the source electrode SE and the drain electrode DE may be formed as a single layer or as multiple layers using one or more metals from the above list. For example, the source electrode SE and the drain electrode DE may each independently be a double layer obtained by sequentially stacking titanium and copper, or the source electrode SE and the drain electrode DE may each independently be a single layer formed by using an alloy of titanium and copper.

The first substrate SUB1 may further include a first insulating layer INL1, which may be deposited on the source electrode SE and the drain electrode DE. The first insulating layer INL1 may be formed by using an insulating material such as silicon oxide or silicon nitride.

The first insulating layer INL1 may include a contact hole CH. The contact hole CH may expose at least a portion of the drain electrode DE.

The pixel electrode PE may be formed on the first insulating layer INL1. The pixel electrode PE may be connected to the drain electrode DE via the contact hole CH with the first insulating layer INL1 therebetween.

The pixel electrode PE may be formed using a transparent conductive material. Particularly, the pixel electrode PE may be formed using a transparent conductive oxide. The transparent conductive oxide may include, for example, indium tin oxide (ITO), indium zinc oxide (IZO), indium tin zinc oxide (ITZO), etc.

The pixel electrode PE may include a stem part PEa and a plurality of branch parts PEb. As described above, each of the pixel areas PXL may include a plurality of domains DM1, DM2, DM3 and DM4.

The plurality of domains DM1, DM2, DM3 and DM4 may be divided by the stem part PEa. The stem part PEa may be provided as diverse shapes. For example, referring to FIG. 2, the stem part PEa may be provided as a cross shape. In this case, the plurality of the domains DM1, DM2, DM3 and DM4 may be divided into a first domain DM1, a second domain DM2, a third domain DM3 and a fourth domain DM4 by the stem part PEa.

A plurality of pixel electrode branch parts PEb may extend from the pixel electrode stem part PEa. Adjacent branch parts among the plurality of the branch parts PEb are separated so as not to meet each other. The adjacent branch parts are separated by spaces having micron dimensions in order to allow for alignment of liquid crystal molecules of liquid crystal layers LCL in each branch part PEb to form specific azimuth angles on a plane parallel to the base substrate.

The branch parts PEb may correspond to first to fourth domains DM1, DM2, DM3 and DM4, and may be extended in different directions from each of the domains DM1, DM2, DM3 and DM4. In addition, the plurality of the branch parts corresponding to the same domain may be extended in directions that are parallel to each other.

The second substrate SUB2 may include a second base substrate BS2, a color filter CF, a black matrix BM, and a common electrode CE.

The second base substrate BS2 may be a transparent insulating substrate and may be formed by using silicon, glass or plastic.

The color filter CF may be formed on the second base substrate BS2 and may impart colors to lights passing through the pixels PX. The light may be provided from, for example, a backlight unit (not shown). The backlight unit may include a light guiding panel, a light source, an optical sheet, etc. The light guiding panel may guide the light provided from the light source toward the display device 10. The light source may be correspondingly provided on the side portion of the light guiding panel and may provide light to the light guiding panel. Alternatively, the light source may be correspondingly provided on the bottom portion of the light guiding panel, however the inventive concept is not limited thereto. At least one of the light sources may be provided, and the light source may include a light emitting diode or a cold cathode fluorescent lamp.

The color filter CF may be one of a red color filter, a green color filter and a blue color filter and may be correspondingly provided in, for example, one pixel area. In addition, the color filter CF may additionally include other color filters, for example, a white color filter.

The color filter CF may be formed on the second base substrate BS2 by forming a color layer exhibiting red, green, blue, or other color and patterning the color layer by a photolithography process. The forming method of the color filter CF is not limited thereto, and an inkjet method, etc., may be applied.

The black matrix BM may be formed on the second base substrate BS2, and may be overlapped with the shield area of the first substrate SUB1. The shield area may be defined as an area in which the gate lines GL, the data lines DL and the thin film transistor TFT are formed. In the shield area, the latter structures may tend to obstruct light emitted by a backlight. In general, since the pixel electrode PE may not be formed in areas overlapping the entire shield area, liquid crystal molecules may not be aligned there, and light leakage may be generated. Thus, the black matrix BM may be formed in the shield area to block the light leakage. The black matrix BM may be formed prior to, after, or at the same time as the formation of the color filter CF. The black matrix BM may be formed by forming a shield layer that absorbs light and patterning the shield layer using a photolithography process. Alternatively, the black matrix BM pattern may be formed by another method such as an inkjet method. In FIG. 3, the color filter CF and the black matrix BM have the same thickness, however the inventive concept is not limited thereto, and the thickness of the color filter CF and the black matrix BM may be different from each other.

Additionally, a planarization layer (not shown) may be formed on the black matrix BM and the color filter CF. The planarization layer may planarize the second substrate SUB2. The planarization layer may be formed as, for example, an organic insulation layer or an inorganic insulation layer.

The common electrode CE may be formed on the color filter CF and the black matrix BM. The common electrode CE may carry a common voltage to all of the pixels PX in the device 10. The common electrode CE may face the pixel electrode PE in each pixel PX and may form an electric field with the pixel electrode PE to drive the liquid crystal layer LCL to assume a desired conformation.

The common electrode CE may be formed by using a transparent conductive material. The common electrode CE may be formed by using a conductive metal oxide, for example, ITO, IZO, ITZO, etc.

In an embodiment of the inventive concept, the color filter CF, the black matrix BM and the common electrode CE are included in the second substrate SUB2, however the inventive concept is not limited thereto. Alternatively, each of the color filter CF, the black matrix BM and the common electrode CE may be included not in the second substrate SUB2 but in the first substrate SUB1.

The liquid crystal layer LCL may be formed between the first substrate SUB1 and the second substrate SUB2. The liquid crystal layer LCL includes liquid crystal molecules. The liquid crystal layer LCL may have negative dielectric anisotropy or positive dielectric anisotropy. The liquid crystal molecules may be aligned in different directions, respectively, in areas corresponding to the plurality of the domains DM1, DM2, DM3, and DM4.

When gate signals are applied to the gate lines GL, respectively, the thin film transistor TFT is turned on. Thus, the data signals applied to respective data lines DL are applied through the thin film transistor TFT to the pixel electrode PE. When the thin film transistor TFT is turned on, and the data signals are applied to the pixel electrode PE, an electric field is formed between the pixel electrode PE and the common electrode CE. With the electric field, the liquid crystal molecules included in the liquid crystal layer LCL are driven to assume new positions. Thus, the quantity of light passing through the liquid crystal layer LCL of each respective pixel may change, and the collective group of pixels may display new images.

The first alignment layer ALN1 may be formed between the first substrate SUB1 and the liquid crystal layer LCL. The first alignment layer ALN1 may include a plurality of areas in correspondence to the first to fourth domains DM1, DM2, DM3, and DM4.

The first alignment layer ALN1 may include a first main alignment layer MAL1 and a first alignment forming layer PTL1. The main alignment layer MAL1 may be formed on the pixel electrode PE and the first insulating layer INL1 to cover the pixel electrode PE.

The first main alignment layer MAL1 may include a commonly used material without specific limitation, for example, a polymer such as polyimide, polyamic acid, polyamide, polyamic imide, polyester, polyethylene, polyurethane, polystyrene, or a mixture thereof.

The first alignment forming layer PTL1 may be formed on the first main alignment layer MAL1. The first alignment forming layer PTL1 may include polymerized reactive mesogen RM. The first alignment forming layer PTL1 included in the display device 10 according to an embodiment of the inventive concept may have a network shape and may be connected as a side chain shape to the first main alignment layer MAL1. However, for convenience of explanation, the first alignment forming layer PTL1 is illustrated as a layer shape similar to the first main alignment layer MAL1.

The second alignment layer ALN2 may be formed between the second substrate SUB2 and the liquid crystal layer LCL. The second alignment layer ALN2 may include a plurality of areas aligned corresponding to the first to fourth domains DM1, DM2, DM3 and DM4.

The second alignment layer ALN2 may include a second main alignment layer MAL2 and a second alignment forming layer PTL2. The second main alignment layer MAL2 may be formed on the common electrode CE.

The second main alignment layer MAL2 may include a commonly used material without specific limitation, for example, a polymer such as polyimide, polyamic acid, polyamide, polyamic imide, polyester, polyethylene, polyurethane, polystyrene, or a mixture thereof. The second main alignment layer MAL2 may be substantially the same as the first main alignment layer MAL1 except for being formed on the second substrate SUB2.

The second alignment forming layer PTL2 may be formed on the second main alignment layer MAL2. The second alignment forming layer PTL2 may include polymerized reactive mesogen RM. The reactive mesogen RM may be represented by the following Formula 1. The second alignment forming layer PTL2 included in the display device 10 according to an embodiment of the inventive concept has a network shape and may be connected to the second main alignment layer MAL2 as a side chain shape. However, for convenience of explanation, the second alignment forming layer PTL2 is illustrated as a layer shape similar to the second main alignment layer MAL2.

The polymerized reactive mesogen RM included in each of the first alignment forming layer PTL1 and the second alignment forming layer PTL2 may be represented by the following Formula 1:

[Formula 1]

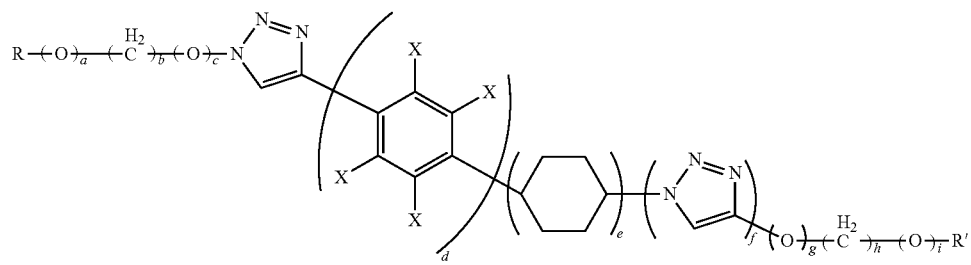

where b and h are independently an integer from 1 to 20, a, c, e, f, g, and i are independently an integer of 0 or 1, and d is an integer from 1 to 3.

In Formula 1, X is a substituent selected from the group consisting of H, $CH_3$, $(CH_2)_pCH_3$ (where p is an integer from 1 to 20), F, Br, I, OH, $C_3H_7$, $NH_2$ and CN.

In Formula 1, R and R' are each independently a substituent selected from the group of substituents represented in the following Formula 2:

[Formula 2]
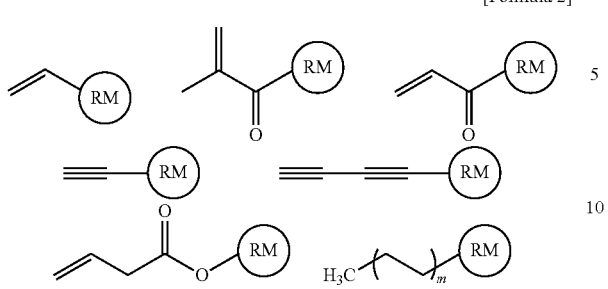
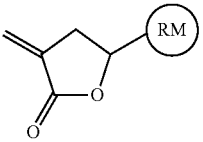
where m is an integer from 1 to 20, and ⓇⓂ denotes an attachment point for a remainder of the reactive mesogen.
More particularly, the reactive mesogen RM may be one compound selected from the compounds represented in the following Formula 3.
[Formula 3]
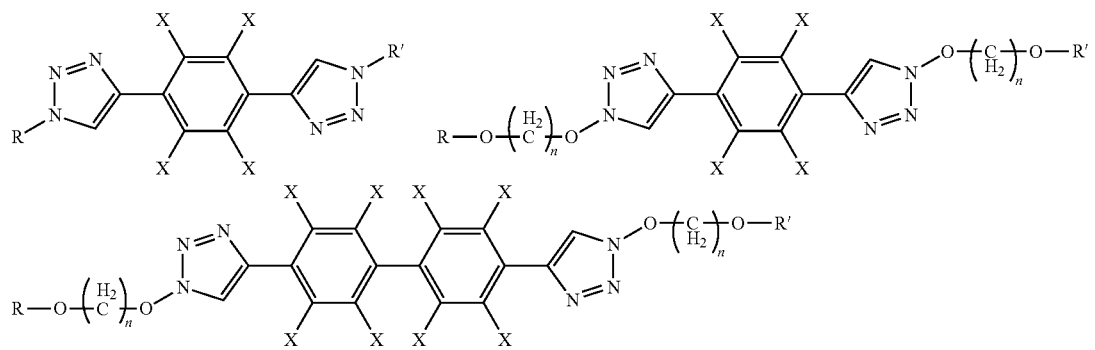
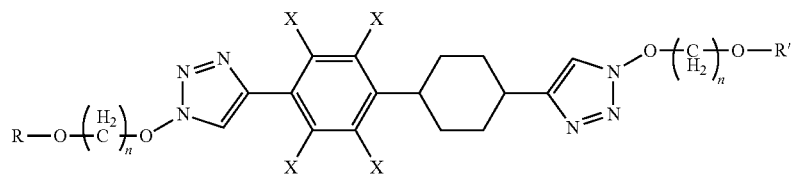
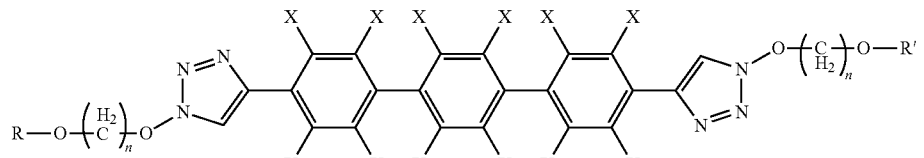
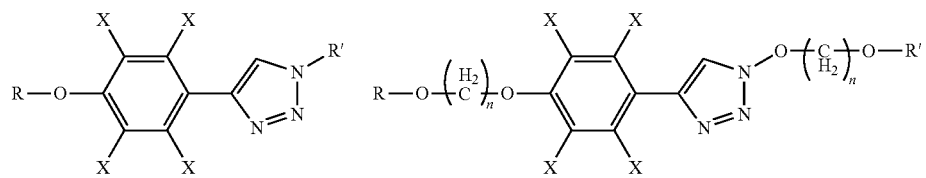
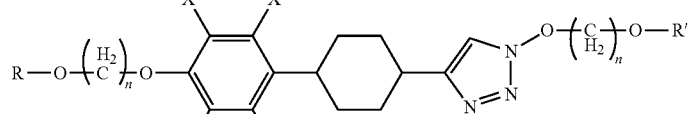
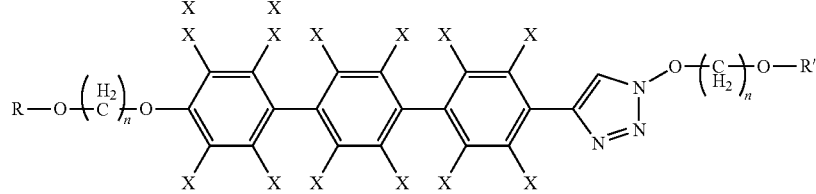

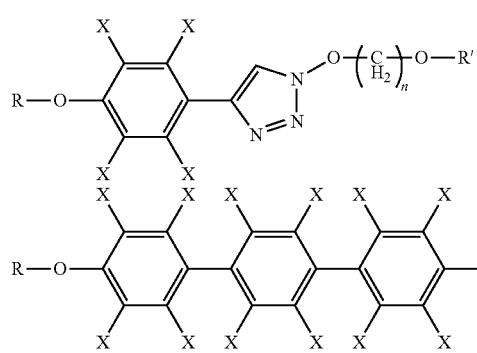
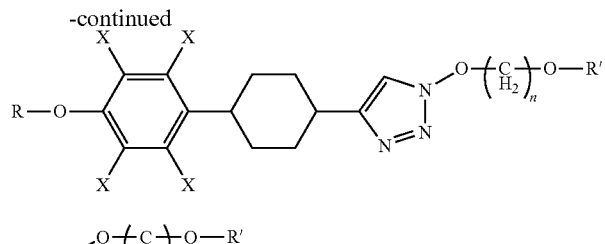

In Formula 3, X is a substituent selected from the group consisting of H, $CH_3$, $(CH_2)_p CH_3$ (where p is an integer from 1 to 20), F, Br, I, OH, $C_3H_7$, $NH_2$ and CN, and n is an integer from 1 to 20.

In Formula 3, R and R' are independently selected from the group consisting of the substituents represented by the following Formula 4:

[Formula 4]

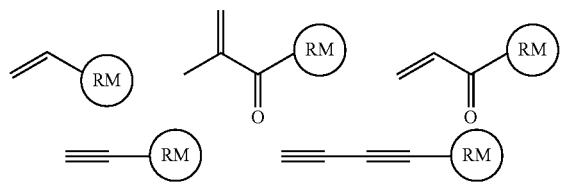
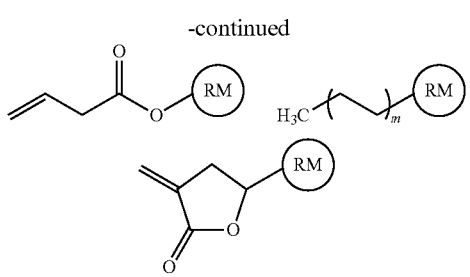

where n is an integer from 1 to 20, and Ⓡᴹ denotes an attachment point for a remainder of the reactive mesogen.

The network formed by polymerized reactive mesogen may, for example, have the following appearance:

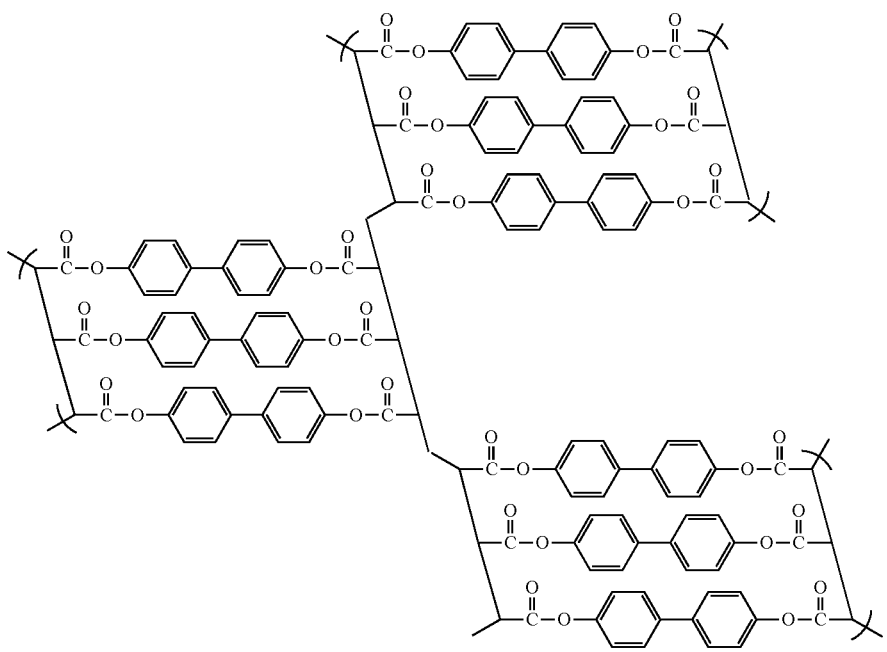

Usefully, as further developed below, this type of network may form around unreactive molecules that may be fixed in position, such as liquid crystal molecules that are aligned in an electric field.

The display device 10 according to an embodiment of the inventive concept may include an alignment layer including polymerized reactive mesogen represented by the above Formula 1 and having higher reactivity than common reactive mesogen, and the display device 10 may show decreased instant afterimage, surface afterimage, black afterimage, etc. Afterimage effects may possibly be generated due to remaining unreacted reactive mesogen in the liquid crystal layer.

Hereinafter, a display device according to FIGS. 1, 2 and 4 will be explained. The particular explanation will be concentrated on the features that are distinct from those of the display device according to FIGS. 1, 2 and 3 as previously explained, and those features not particularly referenced below will correspond to those of the display device according to the embodiment previously presented with reference to FIGS. 1, 2 and 3.

FIG. 4 is a schematic cross-sectional view corresponding to line I-I' in FIG. 2.

Referring to FIGS. 1, 2 and 4, a display device 10 may include a first substrate SUB1, a second substrate SUB2, a liquid crystal layer LCL, a first alignment layer ALN1 and a second alignment layer ALN2.

The first substrate SUB1 may include a first base substrate BS1, a plurality of gate lines GL and a plurality of data lines DL. The first substrate SUB1 may include pixel areas PXL. In the pixel areas PXL, a plurality of pixels PX may be disposed, respectively.

Each of the pixel areas PXL may include a plurality of domains DM. Each of the pixels PX may include a thin film transistor TFT, a pixel electrode PE electrically connected to the thin film transistor TFT, and a common electrode CE facing the pixel electrode PE. The thin film transistor TFT may include a gate electrode GE, a semiconductor pattern SM, a source electrode SE and a drain electrode DE, and a data voltage may be applied to the pixel electrode PE.

The first substrate SUB1 may further include a gate insulating layer GI. The gate insulating layer GI may be formed on the gate electrode GE and may cover the gate electrode GE.

The first substrate SUB1 may further include a first insulating layer INL1 on the semiconductor pattern SM, the source electrode SE and the drain electrode DE. The first insulating layer INL1 may include a contact hole CH. The contact hole CH may expose at least a portion of the drain electrode DE.

The second substrate SUB2 may include a second base substrate BS2, a color filter CF, a black matrix BM and a common electrode CE.

A first alignment layer ALN1 is formed between the first substrate SUB1 and a liquid crystal layer LCL. The first alignment layer ALN1 includes a plurality of areas aligned corresponding to first to fourth domains DM1, DM2, DM3 and DM4.

The first alignment layer ALN1 may include a first main alignment layer MAL1 including a plurality of first side chains SC1. The first main alignment layer MAL1 may be formed on the pixel electrode PE and the first insulating layer INL1 to cover the pixel electrode PE.

The second alignment layer ALN2 may include a second main alignment layer MAL2 including a plurality of second side chains SC2. The second main alignment layer MAL2 may be formed on the common electrode CE.

Each of the first side chains SC1 and the second side chains SC2 is not specifically limited only if forming a vertical alignment. For example, each of the first side chains SC1 and the second side chains SC2 may include diamine forming a vertical alignment. The diamine may be at least one among the diamines represented in the following Formula 5, without limitation.

[Formula 5]

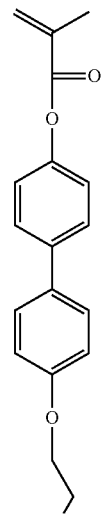

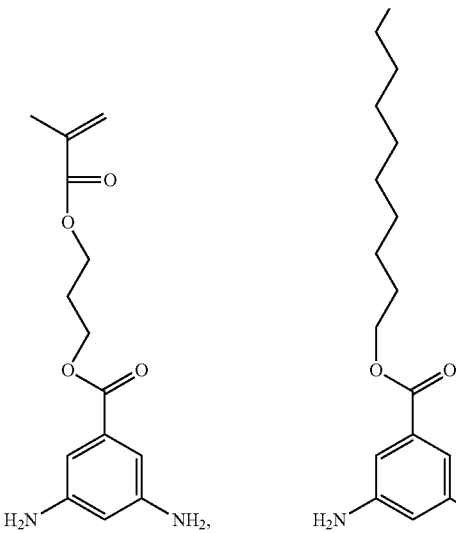

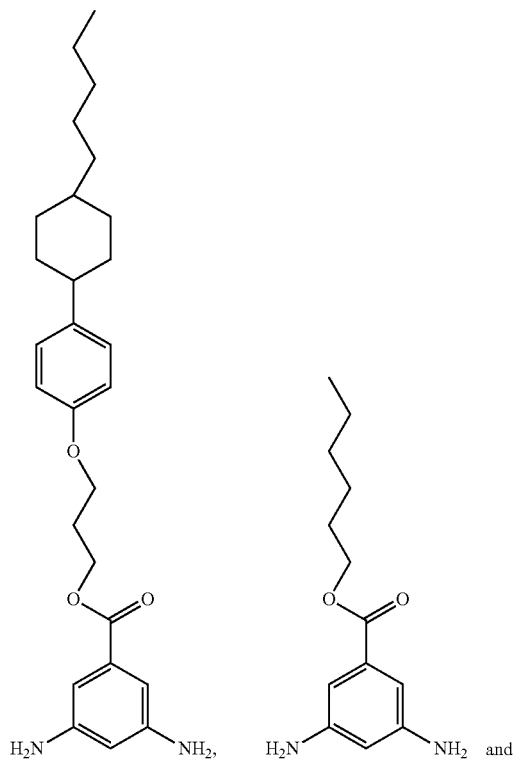

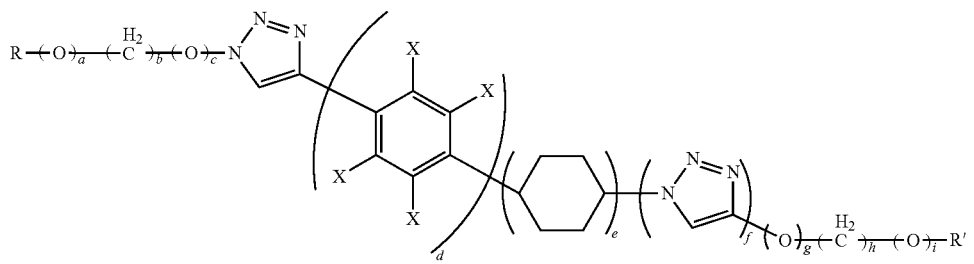

At least a portion of the first side chains SC1 may be connected to each other by reactive mesogen RM and at least a portion of the second side chains SC2 may be connected to each other by reactive mesogen RM.

The reactive mesogen is represented by the following Formula 1.

[Formula 1]

where b and h are independently an integer from 1 to 20, a, c, e, f, g, and i are independently an integer of 0 or 1, and d is an integer from 1 to 3.

In Formula 1, X is a substituent selected from the group consisting of H, $CH_3$, $(CH_2)_p CH_3$ (where p is an integer from 1 to 20), F, Br, I, OH, $C_3H_7$, $NH_2$ and CN.

In Formula 1, R and R' are each independently selected from the group consisting of the substituents represented in the following Formula 2:

[Formula 2]
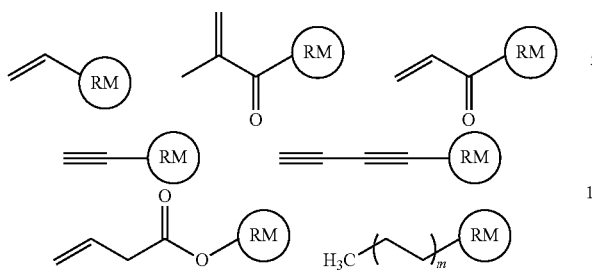
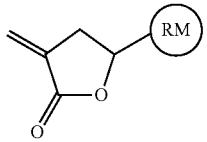
where m is an integer from 1 to 20, and ⓡᴍ denotes an attachment point for a remainder of the reactive mesogen.
More particularly, the reactive mesogen RM may be one compound selected from the compounds represented in the following Formula 3.
[Formula 3]
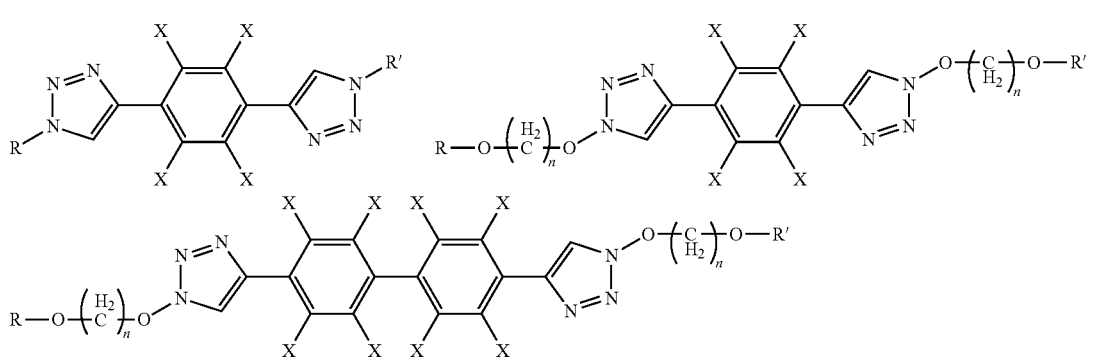
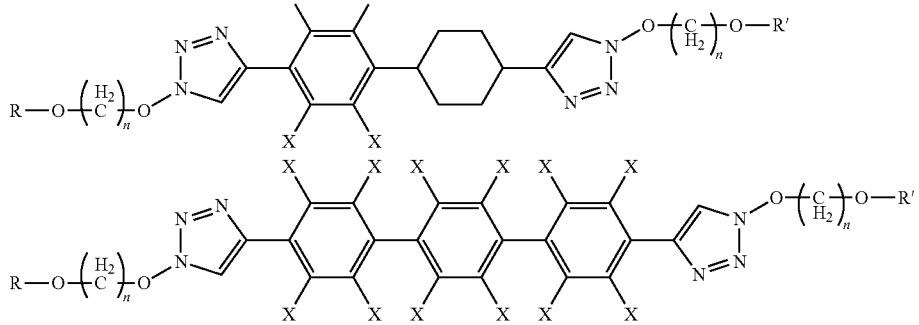
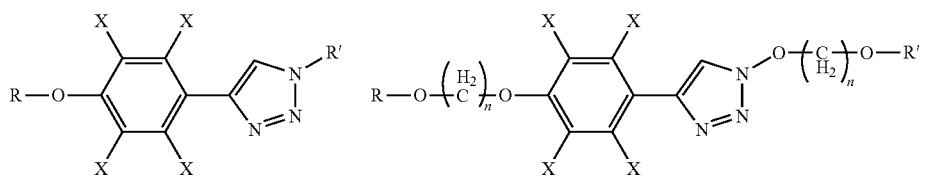
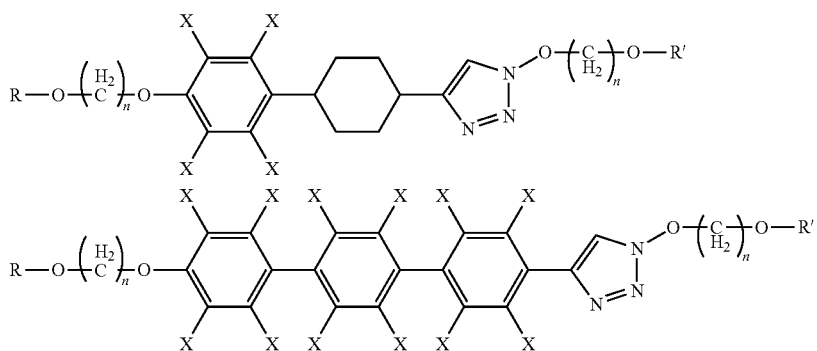

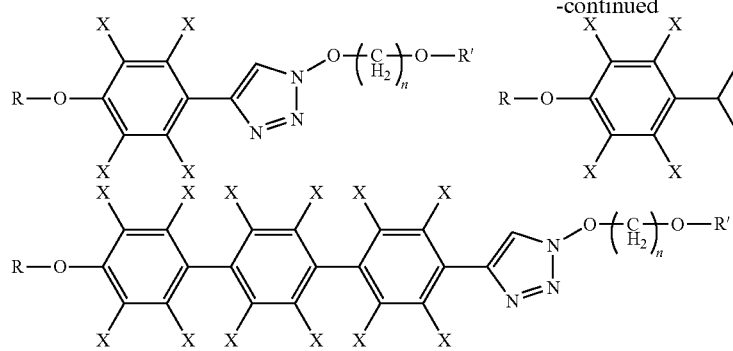
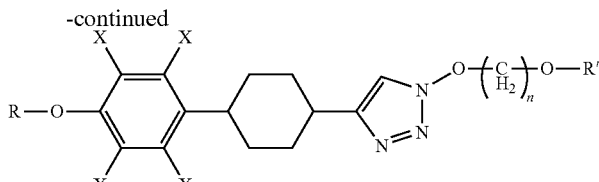

In Formula 3, X is a substituent selected from the group consisting of H, $CH_3$, $(CH_2)_pCH_3$ (where p is an integer from 1 to 20), F, Br, I, OH, $C_3H_7$, $NH_2$ and CN, and n is an integer from 1 to 20.

In Formula 3, R and R' are each independently selected from the group consisting of the substituents represented in the following Formula 4:

[Formula 4]

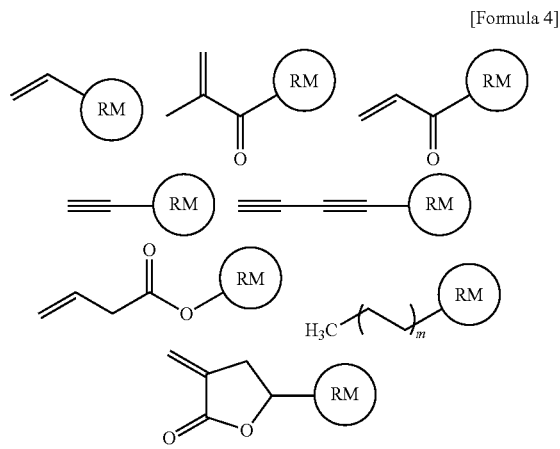

where n is an integer from 1 to 20, and ⓇⓂ denotes an attachment point for a remainder of the reactive mesogen.

The display device according to an embodiment of the inventive concept may include an alignment layer containing polymerized reactive mesogen represented by the above Formula 1 and may have higher reactivity than common reactive mesogen. In the display device according to an embodiment of the inventive concept, at least a portion of the first side chains may be connected to each other by the reactive mesogen, and at least a portion of the second side chains may be connected to each other by the reactive mesogen, thereby increasing crosslinking reactivity and crosslinking density. At least a portion of the first side chains may be connected to each other by the reactive mesogen and at least a portion of the second side chains may be connected to each other by the reactive mesogen to form on the surface of each alignment layer a rigid alignment layer, thereby increasing the mechanical integrity of the alignment layers. The display device according to an embodiment of the inventive concept may include an alignment layer having increased mechanical integrity and corresponding to a display device that may show decreased instant afterimage, surface afterimage, black afterimage, etc. Such afterimages may be generated due to remaining unreacted reactive mesogen in the liquid crystal layer, where unreacted reactive mesogen may lead to unwanted crosslinking during operation of the device. Thus, the display quality of the display device may be improved, and the reliability thereof may be increased.

Hereinafter, a fabrication method of a display device according to an embodiment of the inventive concept will be explained. The particular explanation will be concentrated on the features of the display device that are distinct from features corresponding to the embodiments of the inventive concept that were previously explained, and the remaining parts of the display device will correspond to features of the display device according to embodiments of the inventive concept that were previously explained.

FIG. 5 is a flowchart schematically illustrating a fabrication method of a display device according to an embodiment of the inventive concept.

Referring to FIGS. 1, 2 and 5, a fabrication method of a display device according to an embodiment of the inventive concept may include providing an alignment solution on at least one of a first substrate SUB1 and a second substrate SUB2 (Step S100), curing the alignment solution to form at least one of main alignment layers MAL1 and MAL2 (Step S200), and providing a liquid crystal composition (LC in FIG. 6b) including liquid crystal molecules to form a liquid crystal layer LCL between the first substrate SUB1 and the second substrate SUB2 (Step S300).

Referring to FIGS. 1 and 2, the forming process of the first substrate SUB1 will be explained.

Gate lines GL and a gate electrode GE may be formed on a first base substrate BS1. The gate lines GL and the gate electrode GE may be formed by using, for example, a photolithography process.

A gate insulating layer GI is formed on the gate lines GL and the gate electrode GE. A semiconductor pattern SM is formed on the gate insulating layer GI. The semiconductor pattern SM may be formed by using, for example, a photolithography process.

On the semiconductor pattern SM, data lines DL, a source electrode SE and a drain electrode DE may be formed. Each of the data lines DL, the source electrode SE and the drain electrode DE may be formed by a photolithography process.

The semiconductor pattern SM, the data lines DL, the source electrode SE and the drain electrode DE may be formed by using one of a half mask or a diffraction mask.

A first insulating layer INL1 may be formed on the data lines DL, the source electrode SE and the drain electrode DE. The first insulating layer INL1 may include a contact hole CH exposing a portion of the drain electrode DE and may be formed by using, for example, a photolithography process.

On the first insulating layer INL1, a pixel electrode PE connected to the drain electrode DE through the contact hole CH may be formed. The pixel electrode PE may be formed by using, for example, a photolithography process.

The second substrate SUB2 may be formed by the following process.

On the second base substrate BS2, a color filter CF exhibiting colors and a black matrix BM shielding light leakage may be formed. The black matrix BM may be formed prior to, after or at the same time as the formation of the color filter CF. On the color filter CF and the black matrix BM, a common electrode CE may be formed. The color filter CF and the black matrix BM may be formed by a photolithography process or an inkjet process. The common electrode CE may be formed by various methods and may be formed by using a photolithography process.

FIGS. 6A to 6E are schematic cross-sectional views illustrating, in chronological order, the steps of a fabrication method of a display device according to an embodiment of the inventive concept.

Referring to FIGS. 1, 2, 3, 5 and 6A, an alignment solution may be provided on at least one of a first substrate SUB1 and a second substrate SUB2 (Step S100). The alignment solution may include a solvent and a solid content.

The kind of solvent is not specifically limited and may be used to prepare the alignment solution by mixing with an alignment agent and reactive mesogen. For example, at least one of γ-butyrolactone (γ-BL), ethylene glycol butyl ether (or butyl cellosolve; BCS), and N-methylpyrrolidone (NMP) may be included as the solvent for the alignment solution.

The solid content of the alignment solution may include an alignment agent for forming main alignment layers MAL1 and MAL2 and a reactive mesogen RM for forming the alignment forming layers PTL1 and PTL2.

The alignment agent may be, without limitation, for example, a monomer, a dimer, or an oligomer of a polymer such as polyimide, polyamic acid, polyamide, polyamic imide, polyester, polyethylene, polyurethane, or polystyrene, or a mixture thereof.

The reactive mesogen RM is represented by the following Formula 1.

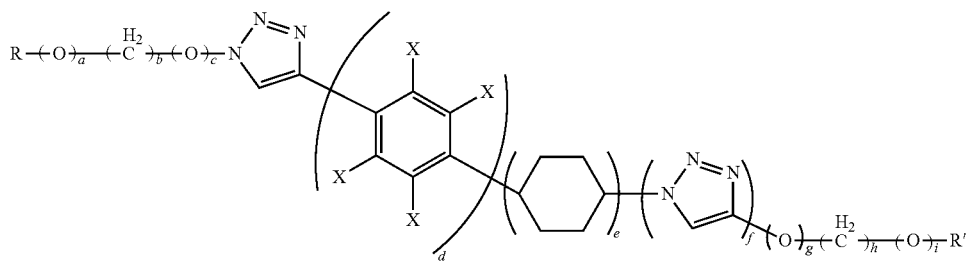

[Formula 1]

where b and h are independently an integer from 1 to 20, a, c, e, f, g, and i are independently an integer of 0 or 1, and d is an integer from 1 to 3.

In Formula 1, X is a substituent selected from the group consisting of H, $CH_3$, $(CH_2)_pCH_3$ (where p is an integer from 1 to 20), F, Br, I, OH, $C_3H_7$, $NH_2$ and CN.

In Formula 1, R and R' are each independently selected from the group consisting of substituents represented in the following Formula 2:

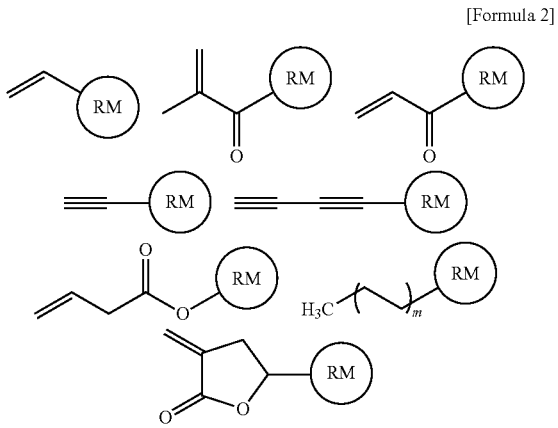

[Formula 2]

where m is an integer from 1 to 20, and Ⓡᴹ denotes an attachment point for a remainder of the reactive mesogen.

More particularly, the reactive mesogen RM may be one compound selected from the compounds represented in the following Formula 3.

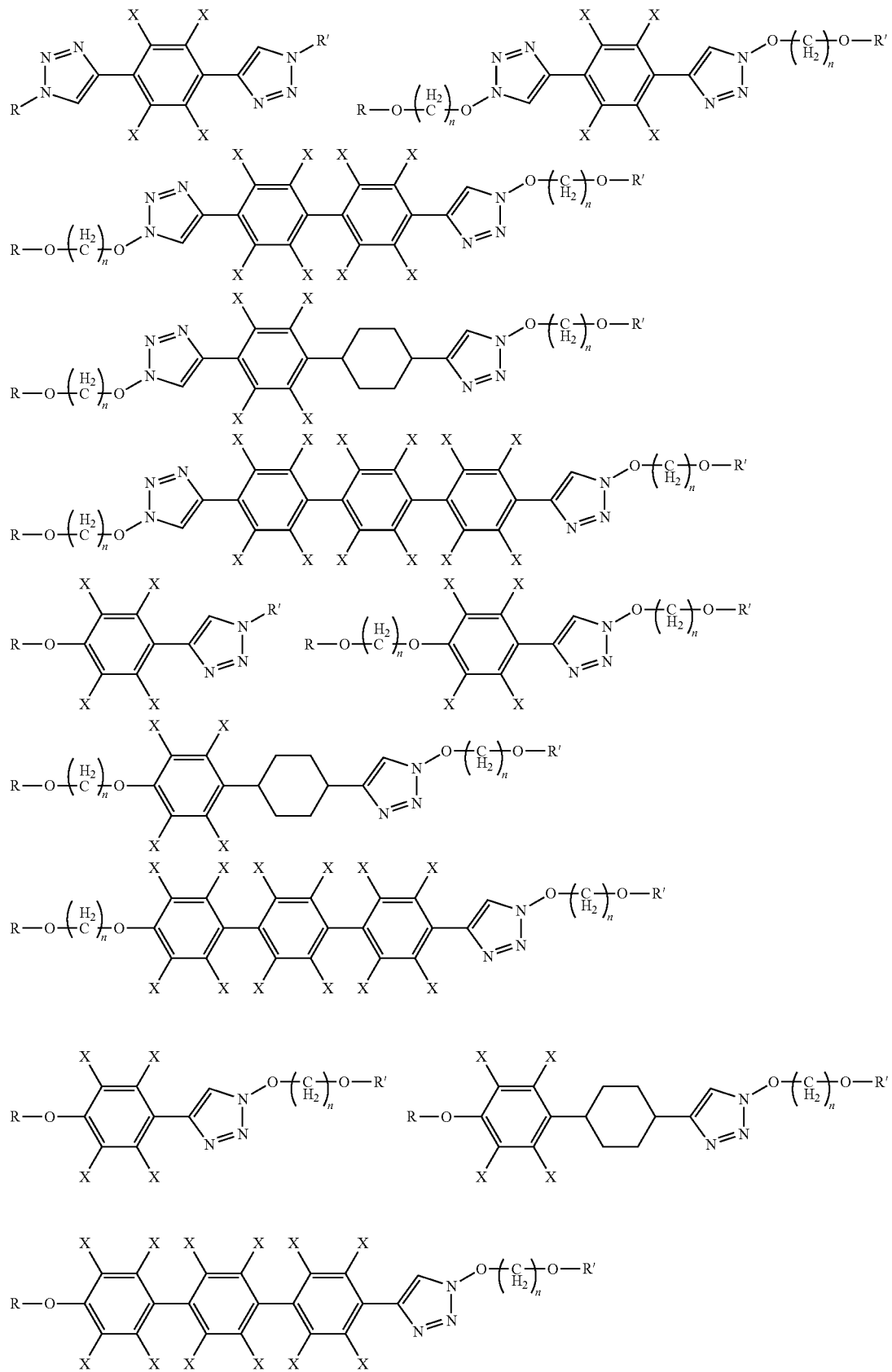
[Formula 3]

In Formula 3, X is a substituent selected from the group consisting of H, CH$_3$, (CH$_2$)$_p$CH$_3$ (where p is an integer from 1 to 20), F, Br, I, OH, C$_3$H$_7$, NH$_2$ and CN, and n is an integer from 1 to 20.

In Formula 3, R and R' are each independently selected from the group consisting of the substituents represented in the following Formula 4:

[Formula 4]

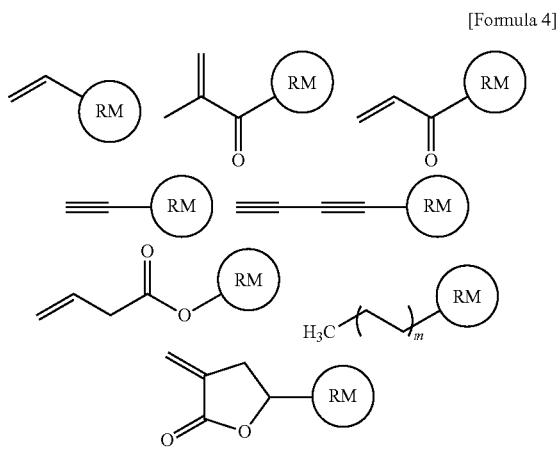

where n is an integer from 1 to 20, and ⓇⓂ denotes an attachment point for a remainder of the reactive mesogen.

The reactive mesogen RM may be included in an amount ratio from about 1 to about 30 wt % based on the solid content. In the case that the amount of the reactive mesogen RM is less than about 1 wt % based on the solid content, the amount of the reactive mesogen RM is insufficient, and photo reactivity may be deteriorated. In the case that the amount of the reactive mesogen RM exceeds about 30 wt % based on the solid content, the amount of the alignment agent is small, and the formation of stable main alignment layers MAL1 and MAL2 may be difficult.

The alignment solution may further include a photo initiator to promote the reaction. The photo initiator may absorb light and be decomposed to radicals, and, thus, may promote the polymerization of the alignment agent, the reactive mesogen RM, etc. The alignment solution may further include a crosslinking agent or an adhesiveness increasing agent other than the reactive mesogen RM.

The alignment solution provided on at least one of the first substrate SUB1 and the second substrate SUB2 may be cured to form main alignment layers MAL1 and MAL2 (Step S200). The alignment solution may be provided on the first substrate SUB1 (Step S100) and cured to form the first main alignment layer MAL1 (Step S200), and the alignment solution may be provided on the second substrate SUB2 (Step S100) and cured to form the second main alignment layer MAL2 (Step S200).

The step of forming the main alignment layers MAL1 and MAL2 by curing the alignment solution (Step S200) may further include pre-curing the alignment solution at a first temperature, and main curing the pre-cured alignment solution at a second temperature higher than the first temperature. The first temperature may be, for example, from about 60 to about 180 degrees. The second temperature may be, for example, from about 150 to about 280 degrees.

The reactive mesogen RM may partially react during the curing process, however the amount cured is not much. Thus, the unreacted reactive mesogen RM is present in the main alignment layers MAL1 and MAL2.

FIGS. 6A-6E depict an embodiment of the inventive fabrication method of a display device that may include initially including a reactive mesogen in an alignment solution, providing the alignment solution on at least one of a first substrate and a second substrate, heat curing to form a main alignment layer, providing a liquid crystal composition comprising liquid crystal molecules to form a liquid crystal layer between the first substrate and the second substrate, applying heat to the main alignment layer and the liquid crystal layer to elute reactive mesogen from the main alignment layer to the liquid crystal layer, and photolysing reactive mesogen molecules in the liquid crystal layer to form an alignment forming layer.

Referring to FIGS. 1, 2, 3, 5 and 6B, a liquid crystal composition LC including liquid crystal molecules may be provided. In FIG. 6B, the liquid crystal composition LC is provided on the first substrate SUB1 as an example embodiment, however the inventive concept is not limited thereto. The liquid crystal composition LC may be provided on the second substrate SUB2.

An encapsulating solution may be provided on at least one of the first substrate SUB1 and the second substrate SUB2. For example, the encapsulating solution is provided along at least one edge part of the first substrate SUB1 and the second substrate SUB2.

The reactive mesogen RM may be included in an amount ratio from about 0.01 to about 10 wt % based on the amount of the liquid crystal composition LC. In the case that the amount of the reactive mesogen RM is less than about 0.01 wt % based on the liquid crystal composition LC, the amount of the reactive mesogen RM is insufficient, and photo reactivity may be deteriorated. In the case that the amount of the reactive mesogen RM exceeds about 10 wt % based on the liquid crystal composition LC, a large amount of unreacted reactive mesogen RM may remain in the liquid crystal layer LCL even though providing light, thereby generating black afterimage, surface afterimage and instant afterimage due to unwanted crosslinking during operation of the device 10.

Referring to FIGS. 1, 2, 3, 5 and 6C, the first substrate SUB1 and the second substrate SUB2 may be faced to each other, and a liquid crystal layer LCL may be formed using the liquid crystal composition LC between the first substrate SUB1 and the second substrate SUB2 (Step S300). In FIGS. 6A-6C, a liquid crystal dropping method is shown as an example embodiment, however the inventive concept is not limited thereto. For example, the liquid crystal layer LCL may be formed using a liquid crystal injection method.

The first substrate SUB1 and the second substrate SUB2 may be faced to each other, and the encapsulating solution may be cured to form an encapsulant SL between the first substrate SUB1 and the second substrate SUB2. The curing temperature of the encapsulating solution may be, for example, from about 110 to about 120 degrees.

Referring to FIGS. 1, 2, 3, 5 and 6D, the reactive mesogen RM in the first main alignment layer MAL1 and the second main alignment layer MAL2 may be eluted into the liquid crystal layer LCL by applying heat to the first main alignment layer MAL1 and the second main alignment layer MAL2. The reactive mesogen RM may diffuse into the liquid crystal layer LCL, the rate of diffusion being increased by the heat.

The step of eluting the reactive mesogen RM into the liquid crystal layer LCL and the step of curing the encapsulating solution may be a single step. That is, by heating the encapsulating solution and the liquid crystal layer LCL at the same time, the encapsulating solution may be cured and the reactive mesogen RM included in the first main alignment layer MAL1 and the second main alignment layer MAL2 may be eluted into the liquid crystal layer LCL at the same time.

Referring to FIGS. 1, 2, 3, 5 and 6E, the liquid crystal layer LCL may be provided with light to perform the reaction of the reactive mesogen RM and to form a first alignment forming layer PTL1 on the first main alignment layer MAL1 and a second alignment forming layer PTL2 on the second main alignment layer MAL2. Each of the first alignment forming layer PTL1 and the second alignment forming layer PTL2 may have a network shape and may be connected to each of the first main alignment layer MAL1 and the second main alignment layer MAL2 as a side chain shape. However, for convenience of explanation, the first alignment forming layer PTL1 and the second alignment forming layer PTL2 are illustrated as a layer shape similar to layer shapes assumed by each of the first main alignment layer MAL1 and the second main alignment layer MAL2.

The step of providing the liquid crystal layer LCL with light to perform the reaction of the reactive mesogen RM may include an electric field exposing step of providing the liquid crystal layer LCL with a first light irradiation while applying an electric field to the liquid crystal layer LCL and may further include a non-electric field exposing step of providing the liquid crystal layer LCL with a second light irradiation after removing the electric field.

The light used for irradiation of the liquid crystal layer may be at least one of, for example, ultraviolet, infrared, far infrared, electron beam and β- or γ-radiation, which may induce the reaction of the reactive mesogen RM. The light irradiation may be directed to the first substrate SUB1 in a vertical direction or an inclined direction. The irradiating angle and the dosage of the light may be dependent on the driving mode of the display device, the physical properties of the material of the alignment layers ALN1 and ALN2, etc. For example, in the electric field exposing step, ultraviolet light with a radiant exposure of about 60 $J/cm^2$ may be provided as the first light irradiation to the liquid crystal layer LCL over from about 40 to about 80 minutes. In the non-electric field exposing step, ultraviolet light having the same or a different wavelength, with the same or a different intensity (with a same or different accumulated radiant exposure over time) as used in the electric field exposing step, for the same or a different time period as used in the electric field exposing step, may be provided as the second light irradiation.

In the electric field light exposing step, the electric field may be formed by applying different voltages to the pixel electrode PE and the common electrode CE. The reactive mesogen RM may be aligned in substantially the same direction as surrounding liquid crystal molecules. When light is incident to the reactive mesogen RM and the surrounding liquid crystal molecules arranged by the application of the electric field, the reactive mesogen RM may undergo a light-induced polymerization reaction to form a network of molecules of reactive mesogen RM. An exposed reactive portion of the mesogen RM network may combine with an adjacent reactive portion of the mesogen RM network to form a side chain. Since the reactive mesogen RM forms the network in the arranged state of the liquid crystal molecules, the liquid crystal molecules have a specific directionality along an average alignment direction. Even though the electric field is removed, the liquid crystal molecules adjacent to the network remain disposed at pre-tilt angles relative to the substrate surface.

In the non-electric field light exposing step, the reaction of the unreacted parts of the first alignment forming layer PTL1 and the second alignment forming layer PTL2 and unreacted reactive mesogen RM is completed. After completing the reaction, the first alignment forming layer PTL1 and the second alignment forming layer PTL2 may be stabilized.

In the fabrication method of a display device according to an embodiment of the inventive concept, an alignment layer including polymerized reactive mesogen represented by the above Formula 1 and having higher reactivity than common reactive mesogen is formed, and the instant afterimage, the surface afterimage, the black afterimage, etc., of the display device, which may be generated by the remaining uncured reactive mesogen in the liquid crystal layer, may be decreased. Thus, display quality may be improved, and a display device having high reliability may be fabricated.

The fabrication method according to some embodiments of the present invention may be summarized according to the scheme shown in FIG. 7. Referring to FIG. 7, step A shows a film coating step to form main alignment layer(s) on substrate(s), step B shows liquid crystal solution that has been applied using a dropping method, step C shows assembly of a display device, the assembly causing the second substrate to face the first substrate with the liquid crystal composition therebetween, step D shows curing of the alignment solution using heat to form cured main alignment layer(s), the heat causing reactive mesogen molecules to elute into the liquid crystal layer, and step E shows exposure of the display device to light, causing a photochemical reaction connecting reactive mesogen molecules to each other to form a network structure.

FIGS. 8A-8D depict an embodiment of the inventive fabrication method of a display device that may include initially including an aligning diamine in an alignment solution, providing the alignment solution on at least one of a first substrate and a second substrate, heat curing to form a main alignment layer that includes a plurality of side chains that may protrude from the main alignment layer surface, providing a liquid crystal composition comprising liquid crystal molecules and a reactive mesogen to form a liquid crystal layer between the first substrate and the second substrate, and providing light to the region of the main alignment layer surface to induce the reactive mesogen in the liquid crystal layer to connect at least a portion of the side chains to each other, the reactive mesogen molecules serving as bridges between the side chains.

Hereinafter, a fabrication method of a display device according to FIGS. 1, 2, 4, 5, and 8A to 8D will be explained. The particular explanation will be concentrated on the features of the fabrication method that are distinct from those of the fabrication method of a display device according to FIGS. 1, 2, 3, 5, and 6A to 6E, and the remaining features will correspond to the fabrication method of a display device according to FIGS. 1, 2, 3, 5, and 6A to 6E as previously explained.

FIGS. 8A to 8D are schematic cross-sectional views illustrating in chronological order the steps of a fabrication method of a display device according to an embodiment of the inventive concept.

Referring to FIGS. 1, 2, 4, 5, and 8A, an alignment solution may be provided on at least one of a first substrate SUB1 and a second substrate SUB2 (Step S100). The alignment solution may include a solvent and an alignment agent.

The kind of the solvent is not specifically limited if used for preparing the alignment solution by mixing with an alignment agent and reactive mesogen. For example, at least one of γ-butyrolactone (γ-BL), ethylene glycol butyl ether (or butyl cellosolve; BCS) and N-methylpyrrolidone (NMP) may be included.

The alignment agent forms main alignment layers MAL1 and MAL2 and may be, without limitation, for example, a monomer, a dimer, or an oligomer of a polymer such as polyimide, polyamic acid, polyamide, polyamic imide, polyester, polyethylene, polyurethane, polystyrene, or a mixture thereof.

The alignment solution may further include a photo initiator promoting the reaction. The photo initiator may absorb light and be decomposed to radicals, and, thus, the polymerization reaction of the alignment agent, etc., may be promoted. The alignment solution may further include a crosslinking agent or an adhesiveness increasing agent.

By curing the alignment solution provided on at least one of the first substrate SUB1 and the second substrate SUB2, main alignment layers MAL1 and MAL2 may be formed (Step S200). The first main alignment layer MAL1 may be formed by providing the alignment solution on the first substrate SUB1 (Step S100) and curing the alignment solution (Step S200), and the second main alignment layer MAL2 may be formed by providing the alignment solution on the second substrate SUB2 (Step S100) and curing the alignment solution (Step S200).

The step of curing the alignment solution to form the main alignment layers MAL1 and MAL2 may include a step of forming main alignment layers MAL1 and MAL2 including a plurality of side chains SC1 and SC2. A first alignment layer ALN1 may include a first main alignment layer MAL1 including a plurality of first side chains SC1. A second alignment layer ALN2 may include a second main alignment layer MAL2 including a plurality of second side chains SC2.

The kind of each of the first side chains SC1 and the second side chains SC2 is not specifically limited as long as they are vertically aligned (aligned perpendicular to the substrate surface). For example, each of the first side chains SC1 and the second side chains SC2 may include vertically aligning diamine. The diamine may be at least one of the compounds represented in the following Formula 5, without limitation.

[Formula 5]

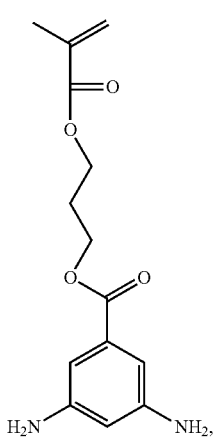

-continued

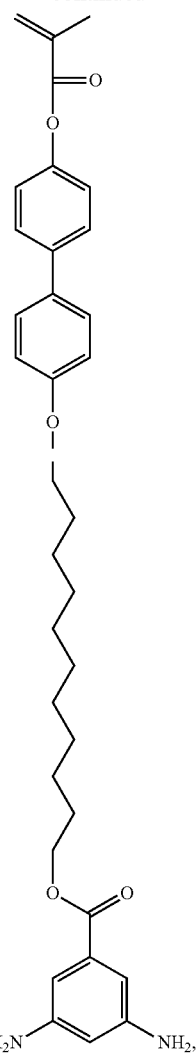

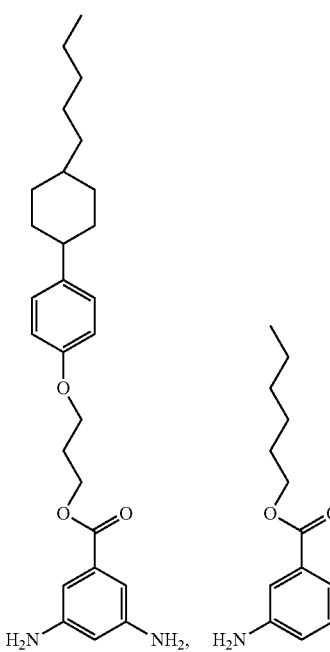

and

-continued

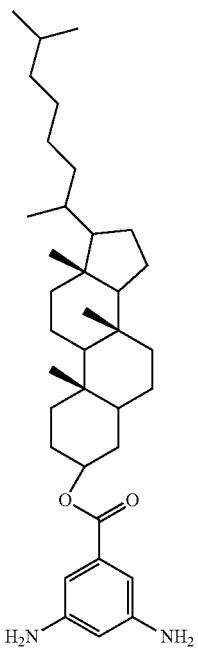

Figure 8A:
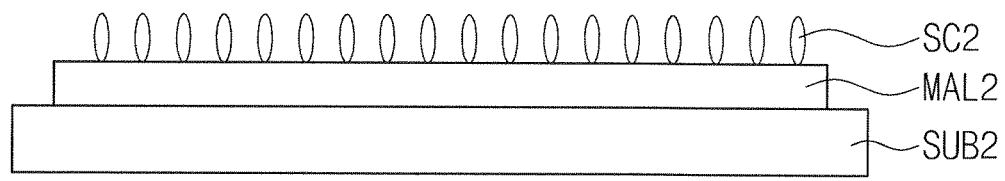
Figure 8A:
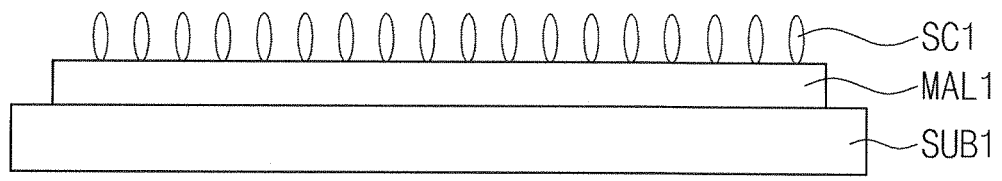
Figure 8B:
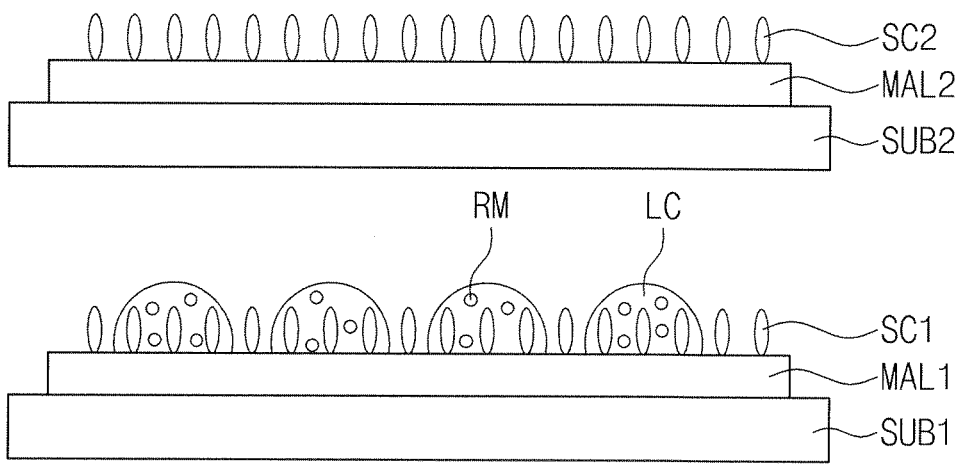

Referring to FIGS. 1, 2, 4, 5 and 8B, a liquid crystal composition LC including liquid crystal molecules is provided. In FIG. 8B, the liquid crystal composition LC is provided on the first substrate SUB1 as an example embodiment; however, the inventive concept is not limited thereto. The liquid crystal composition LC may be provided on the second substrate SUB2.

An encapsulating solution may be provided on at least one of the first substrate SUB1 and the second substrate SUB2. For example, the encapsulating solution is provided along at least one edge part of the first substrate SUB1 and the second substrate SUB2.

The liquid crystal composition LC may include reactive mesogen RM represented by the following Formula 1:

where b and h are independently an integer from 1 to 20, a, c, e, f, g, and i are independently an integer of 0 or 1, and d is an integer from 1 to 3.

In Formula 1, X is a substituent selected from the group consisting of H, CH$_3$, (CH$_2$)$_p$CH$_3$ (where p is an integer from 1 to 20), F, Br, I, OH, C$_3$H$_7$, NH$_2$ and CN.

In Formula 1, R and R' are each independently selected from the group consisting of the substituents represented in the following Formula 2:

[Formula 2]

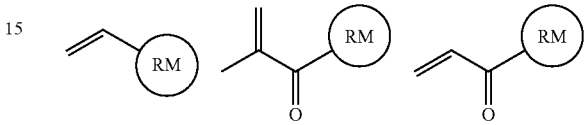

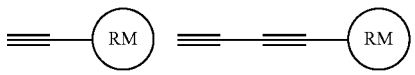

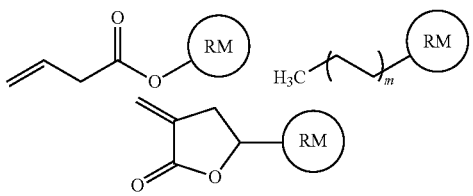

where m is an integer from 1 to 20, and  denotes an attachment point for a remainder of the reactive mesogen.

More particularly, the reactive mesogen RM may be one compound selected from the compounds represented in the following Formula 3:

[Formula 1]

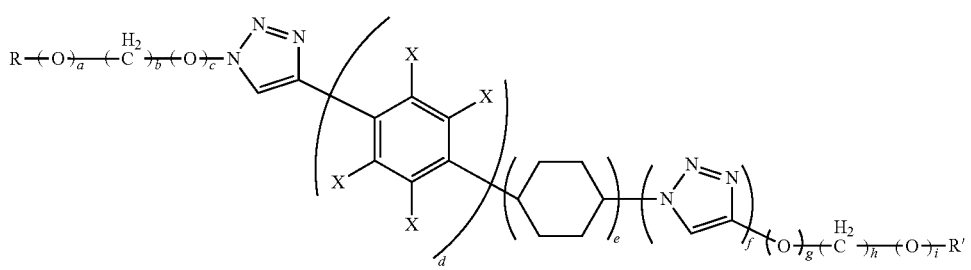

[Formula 3]
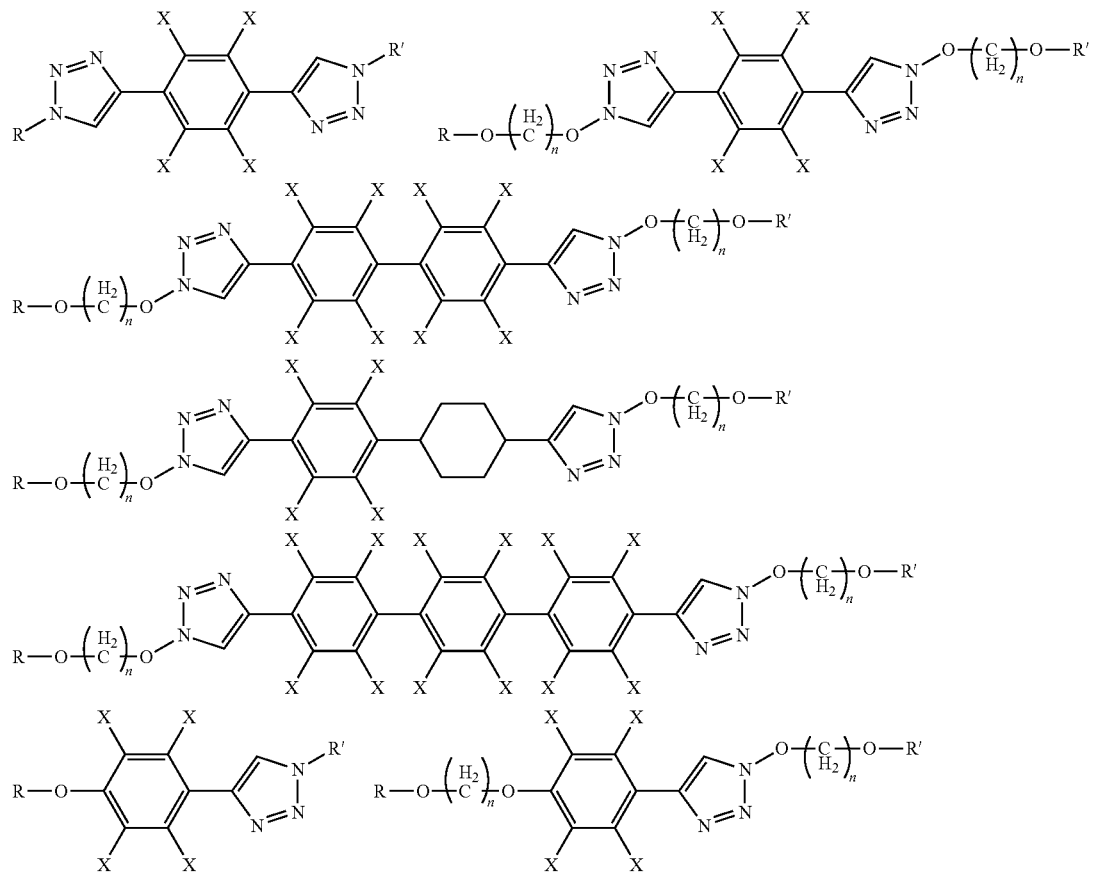
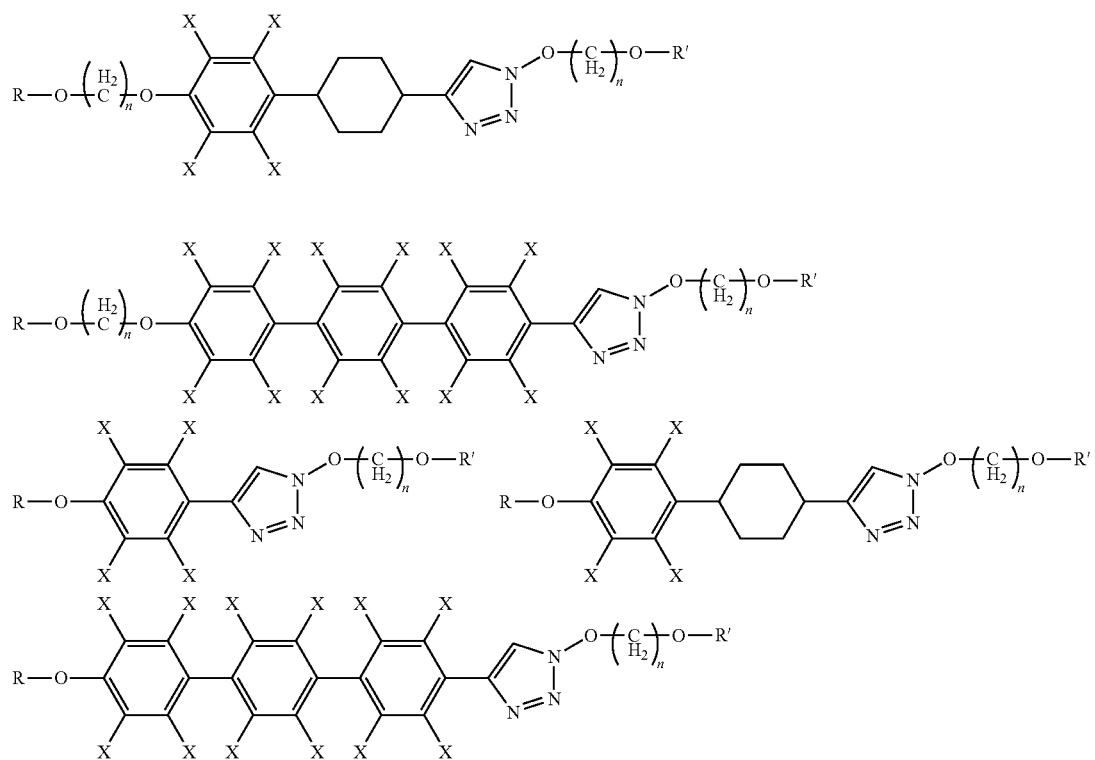

In Formula 3, X is a substituent selected from the group consisting of H, $CH_3$, $(CH_2)_pCH_3$ (where p is an integer from 1 to 20), F, Br, I, OH, $C_3H_7$, $NH_2$ and CN, and n is an integer from 1 to 20.

In Formula 3, R and R' are each independently selected from the group consisting of the substituents represented by the following Formula 4:

[Formula 4]

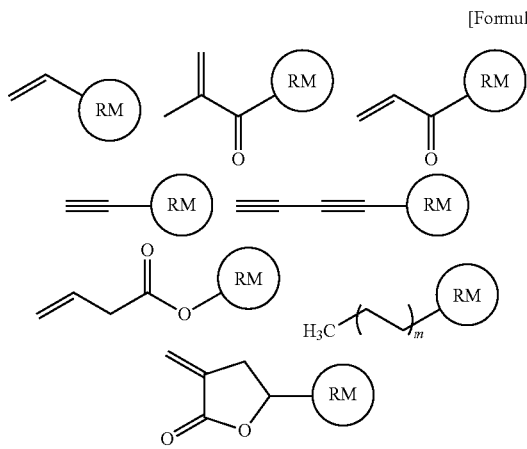

where n is an integer from 1 to 20, and ⓇⓂ denotes an attachment point for a remainder of the reactive mesogen.

The reactive mesogen RM may be included in an amount ratio from about 0.01 to 10 wt % based on the amount of the liquid crystal composition LC. In the case that the amount of the reactive mesogen RM is less than about 0.01 wt % based on the amount of the liquid crystal composition LC, the amount of the reactive mesogen RM is insufficient, and photo reactivity may be deteriorated. In the case that the amount of the reactive mesogen RM exceeds about 10 wt % based on the amount of the liquid crystal composition LC, even after providing light irradiation, a large amount of uncured reactive mesogen may remain in the liquid crystal layer LCL, and black afterimage, surface afterimage, instant afterimage, etc., may be generated due to unwanted crosslinking that may occur during operation of the display device.

Figure 8C:
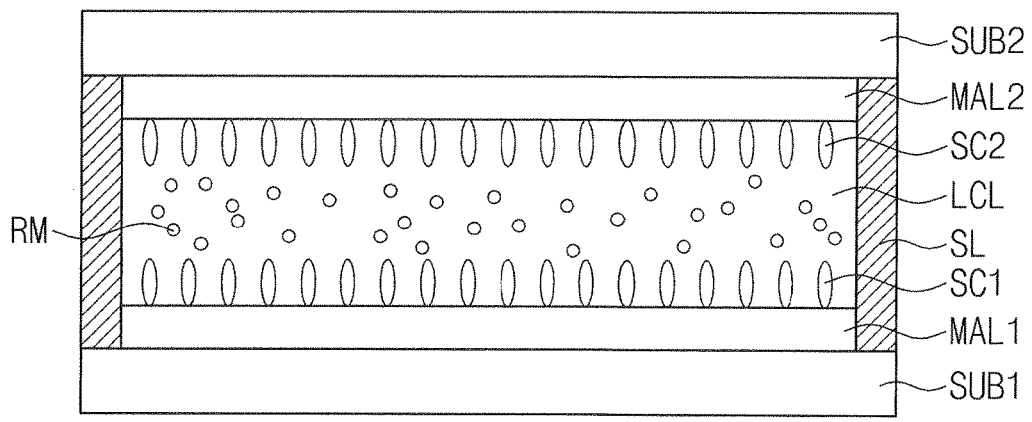
Figure 8D:
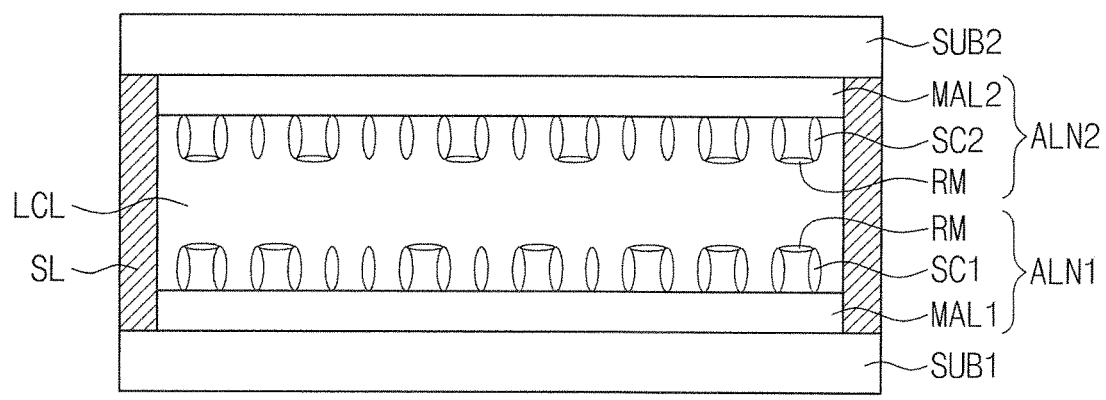

Referring to FIGS. 1, 2, 4, 5 and 8C, the first substrate SUB1 and the second substrate SUB2 may be faced to each other, and a liquid crystal layer LCL may be formed between the first substrate SUB1 and the second substrate SUB2 (Step S300). Even though a liquid crystal dropping method is shown in FIGS. 8B and 8C, the inventive concept is not limited thereto. A liquid crystal layer LCL may be formed by using, for example, a liquid crystal injection method.

The reactive mesogen RM may partially react during the curing process, however the amount of reactive mesogen RM consumed in this manner is not much. Thus, unreacted reactive mesogen RM may be present in the liquid crystal layer LCL.

The first substrate SUB1 and the second substrate SUB2 may be faced to each other, and an encapsulating solution may be cured to form an encapsulant SL between the first substrate SUB1 and the second substrate SUB2. The curing temperature of the encapsulating solution may be, for example, from about 110 to about 120 degrees.

Referring to FIGS. 1, 2, 4, 5 and 8D, at least a portion of the first side chains SC1 and at least a portion of the second side chains SC2 may react with the reactive mesogen RM if the liquid crystal layer LCL is irradiated with light. Thus, at least a portion of the first side chains SC1 may be connected to the reactive mesogen RM, and at least a portion of the first side chains SC1 may be connected to each other by the reactive mesogen RM. At least a portion of the second side chains SC2 may be connected to the reactive mesogen RM, and at least a portion of the second side chains SC2 may be connected to each other by the reactive mesogen RM.

A display device fabricated by the fabrication method of a display device according to an embodiment of the inventive concept may include an alignment layer including polymerized reactive mesogen represented by the above Formula 1 and having higher reactivity than common reactive mesogen. In the display device fabricated by the fabrication method of a display device according to an embodiment of the inventive concept, at least a portion of the first side chains are connected to each other by the reactive mesogen, and at least a portion of the second side chains are connected to each other by the reactive mesogen, thereby increasing crosslinking reactivity and crosslinking density. Through the connection of the at least a portion of the first side chains and the connection of at least a portion of the second side chains, a rigid alignment layer may be formed on the surface of each main alignment layer, and, thus, mechanical integrity of the alignment layers may be increased. The display device fabricated by the fabrication method of a display device according to an embodiment of the inventive concept includes an alignment layer having improved mechanical integrity and may decrease the occurrence during operation of the display device of instant afterimage, surface afterimage, black afterimage, etc., of the display device due to uncured reactive mesogen remaining in the liquid crystal layer. Thus, display quality of the display device may be improved, and the reliability thereof may be increased.

Side chains on the surfaces of the alignment layers may be connected to each other by photochemical reactions, either directly or via an intervening reactive mesogen molecule. This process may be depicted as shown in FIG. 9.

Hereinafter, the inventive concept will be explained in more detail referring to particular examples. The following examples are illustrated to assist in developing an understanding of the inventive concept; however, the scope of the inventive concept is not limited thereto.

Example 1

A display device in which side chains are not formed on a main alignment layer, and reactive mesogen is included in an alignment forming layer, and having a structure corresponding to FIGS. 1, 2 and 3 was fabricated.

The reactive mesogen is represented by the following Formula 6.

[Formula 6]

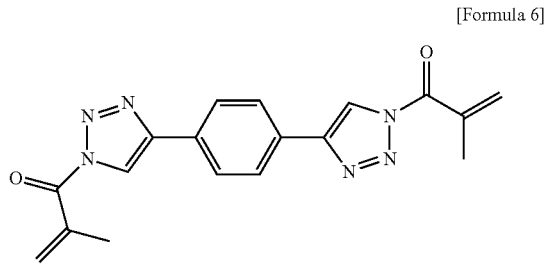 [SMILES: C=C(C)C(=O)n1cc(-c2ccc(-c3cn(C(=O)C(=C)C)nn3)cc2)nn1]

The reactive mesogen was prepared by the following Reaction 1 and Reaction 2.

[Reaction 1]

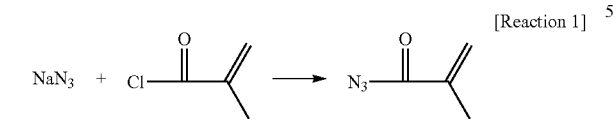

[Reaction 2]

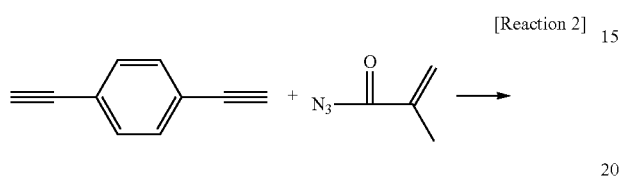

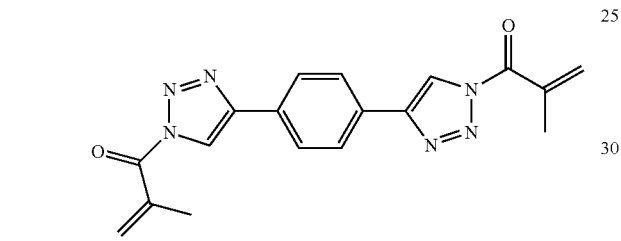

Example 2

A display device in which side chains are formed on a main alignment layer, and a portion of the side chains and the reactive mesogen are combined by the reactive mesogen, and having a structure corresponding to FIGS. 1, 2 and 4 was fabricated.

The side chain is a diamine represented by the following Formula.

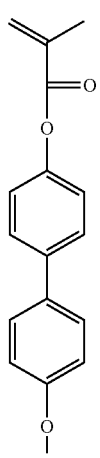

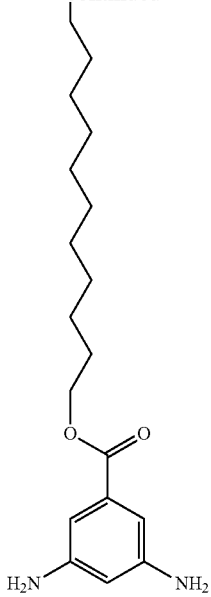

The reactive mesogen was the same reactive mesogen used in Example 1.

Comparative Example 1

A display device was fabricated by the same procedure in Example 2 except that the side chains and the reactive mesogen were not combined.

Experimental Results

The afterimage was evaluated for each of the display devices according to Examples 1 and 2 and Comparative Example 1.

TABLE 1

|  | Instant afterimage (8 G/64 G) | Black afterimage (24 hr) |
|---|---|---|
| Example 1 | 1.6 | 1.6 |
| Example 2 | 3.2 | 1.4 |
| Comparative Example 1 | 8.2 | 3.6 |

Referring to the above Table 1, each of the display devices according to Example 1 and Example 2 has improved effect of instant afterimage and black afterimage when compared to Comparative Example 1.

The above-disclosed subject matter is to be considered illustrative, exemplary and not restrictive, and the appended claims are intended to cover various modifications, equivalent arrangements, enhancements, and other embodiments which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A fabrication method of a display device, the method comprising:
   providing a first substrate and a second substrate;
   providing an alignment solution;

coating the alignment solution on at least one of the first substrate and the second substrate;
curing the alignment solution to form a main alignment layer;
providing a liquid crystal composition comprising liquid crystal molecules; and
using the liquid crystal composition to form a liquid crystal layer between the first substrate and the second substrate,
wherein the alignment solution or the liquid crystal composition comprises a reactive mesogen represented by the following Formula 1:

[Formula 1]

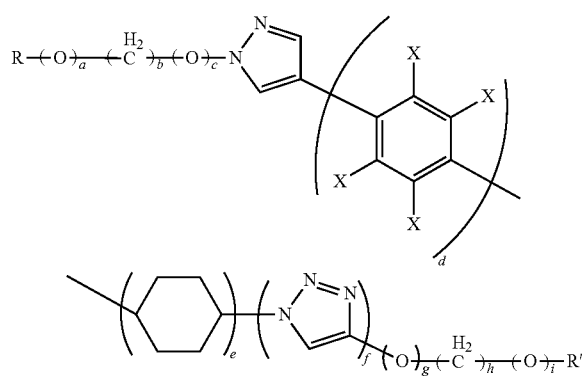

where b and h are independently an integer from 1 to 20, a, c, e, f, g, and i are independently an integer of 0 or 1, and d is an integer from 1 to 3,
X is a substituent selected from the group consisting of H, $CH_3$, $(CH_2)_pCH_3$ (where p is an integer from 1 to 20), F, Br, I, OH, $C_3H_7$, $NH_2$ and CN,
R and R' are each independently a substituent selected from the group consisting of substituents represented in the following Formula 2:

[Formula 2]

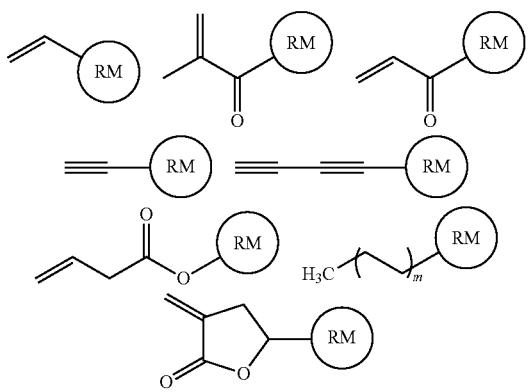

where m is an integer from 1 to 20, and ⓇⓂ denotes an attachment point for a remainder of the reactive mesogen.

2. The fabrication method of a display device as claimed in claim 1, the alignment solution comprising the reactive mesogen, the method further comprising:

applying heat to the main alignment layer and the liquid crystal layer to elute the reactive mesogen in the main alignment layer to the liquid crystal layer; and
providing the liquid crystal layer with light to perform reaction of the reactive mesogen to form an alignment forming layer.

3. The fabrication method of a display device as claimed in claim 2, the curing step further comprising:
pre-curing the alignment solution at a first temperature; and
main curing the pre-cured alignment solution at a second temperature higher than the first temperature.

4. The fabrication method of a display device as claimed in claim 2, the alignment solution comprising a solvent and a solid content,
the solid content comprising an alignment agent forming the main alignment layer and the reactive mesogen forming the alignment forming layer, and
the reactive mesogen being included in an amount ratio from about 1 to about 30 wt % based on an amount of the solid content.

5. The fabrication method of a display device as claimed in claim 2, the using step further comprising:
providing the liquid crystal composition on at least one of the first substrate and the second substrate;
providing an encapsulating solution on at least one of the first substrate and the second substrate;
facing the first substrate and the second substrate with the liquid crystal composition therebetween; and
curing the encapsulating solution.

6. The fabrication method of a display device as claimed in claim 5, the eluting of the reactive mesogen into the liquid crystal layer and the curing of the encapsulating solution being a single step.

7. The fabrication method of a display device as claimed in claim 1, the curing of the alignment solution to form the main alignment layer comprising forming a main alignment layer including a plurality of side chains.

8. The fabrication method of a display device as claimed in claim 7, the liquid crystal composition comprising the reactive mesogen, the method further comprising:
providing light to perform reaction between at least a portion of the side chains and the reactive mesogen connecting the at least a portion of the side chains to each other through the reactive mesogen.

9. The fabrication method of a display device as claimed in claim 1, further comprising:
exposing the liquid crystal layer to a first light while applying an electric field to the liquid crystal layer;
removing the electric field; and
exposing the liquid crystal layer to a second light.

10. The fabrication method of a display device as claimed in claim 1, the liquid crystal composition comprising the reactive mesogen, the reactive mesogen being included in an amount ratio from about 0.01 to about 10 wt % based on an amount of the liquid crystal composition.

11. A display device comprising:
a first substrate;
a second substrate facing the first substrate;
a liquid crystal layer formed between the first substrate and the second substrate;
a first alignment layer formed between the first substrate and the liquid crystal layer; and a second alignment layer formed between the second substrate and the liquid crystal layer,
at least one of the first alignment layer and the second alignment layer comprising a polymerized reactive mesogen, and
the reactive mesogen being represented by the following Formula 1:

[Formula 1]

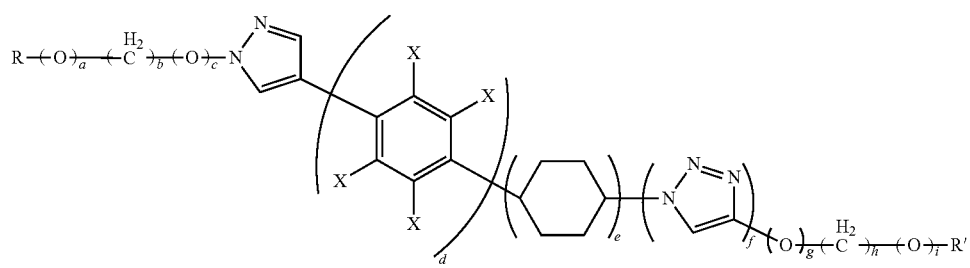

b and h are independently an integer from 1 to 20, a, c, e, f, g, and i are independently an integer of 0 or 1, and d is an integer from 1 to 3,
X is a substituent selected from the group consisting of H, $CH_3$, $(CH_2)_p CH_3$ (where p is an integer from 1 to 20), F, Br, 1, OH, $C_3H_7$, $NH_2$ and CN, and
R and R' are each independently a substituent selected from the group consisting of substituents represented in the following Formula 2:

[Formula 2]

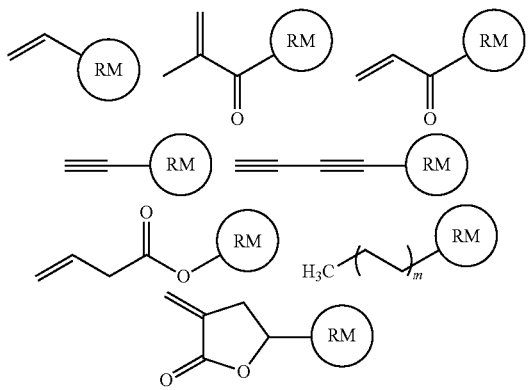

where m is an integer from 1 to 20, and ⓇⓂ denotes an attachment point for a remainder of the reactive mesogen.

12. The display device of claim 11,
the first alignment layer comprising:
a first main alignment layer; and
a first alignment forming layer formed on the first main alignment layer,
the second alignment layer comprising:
a second main alignment layer; and
a second alignment forming layer formed on the second main alignment layer,
each of the first alignment forming layer and the second alignment forming layer comprising polymerized reactive mesogen.

13. The display device of claim 11,
the first alignment layer comprising a first main alignment layer, the first main alignment layer including a plurality of first side chains,
the second alignment layer comprising a second main alignment layer, the second main alignment layer including a plurality of second side chains,
at least a portion of the first side chains and at least of a portion of the second side chains being connected to each other by the reactive mesogen.

14. The display device of claim 13, each of the first side chains and the second side chains comprising a vertically aligning diamine.

15. The display device of claim 11, further comprising pixels forming images,
each of the pixels comprising:
a thin film transistor;
a pixel electrode electrically connected to the thin film transistor; and
a common electrode facing the pixel electrode.

16. The display device of claim 15, the pixel electrode comprising:
a stem part; and
a plurality of branch parts extruded and extended from the stem part.

17. The display device of claim 16,
the pixels further comprising respectively disposed pixel areas,
each of the pixel areas further comprising a plurality of domains, and
the plurality of domains being divided by the stem part.

18. The display device of claim 17, comprised of:
the plurality of the branch parts being extended in parallel to each other in each of the plurality of the domains, and
each of the plurality of the domains being extended in different directions from each other.

19. A fabrication method of a display device, the method comprising:
providing a first substrate and a second substrate;
providing an alignment solution;
coating the alignment solution on at least one of the first substrate and the second substrate;
curing the alignment solution to form a main alignment layer;
providing a liquid crystal composition comprising liquid crystal molecules and a reactive mesogen; and
using the liquid crystal composition to form a liquid crystal layer between the first substrate and the second substrate,
wherein the reactive mesogen represented by the following Formula 1:

[Formula 1]

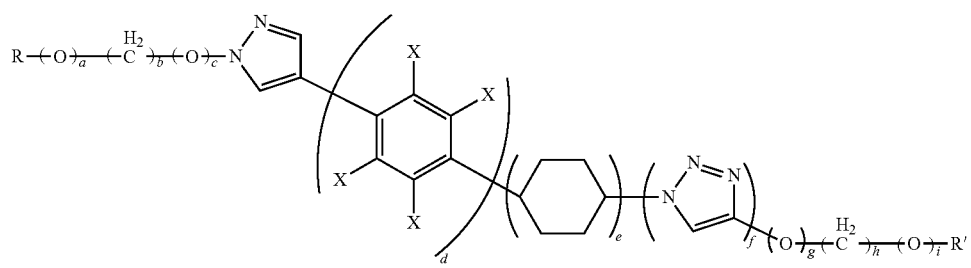

where:
b and h are independently an integer from 1 to 20, a, c, e, f, g, and i are independently an integer of 0 or 1, and d is an integer from 1 to 3,
X is a substituent selected from the group consisting of H, $CH_3$, $(CH_2)_p CH_3$ (where p is an integer from 1 to 20), F, Br, I, OH, $C_3H_7$, $NH_2$ and CN,
R and R' are each independently a substituent selected from the group consisting of substituents represented in the following Formula 2:

[Formula 2]

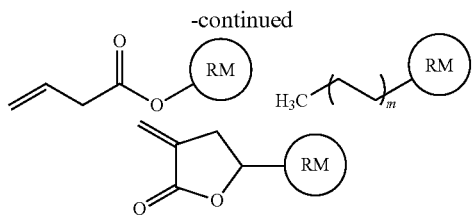

-continued where m is an integer from 1 to 20, and (RM) denotes an attachment point for a remainder of the reactive mesogen.

20. The fabrication method of a display device as claimed in claim 19, the alignment solution comprising a vertically aligning diamine, the method further comprising providing the liquid crystal layer with light to induce reaction of the reactive mesogen to form an alignment forming layer.

21. The fabrication method of a display device as claimed in claim 20, the reactive mesogen being selected from the compounds represented in the following Formula 3:

[Formula 3]

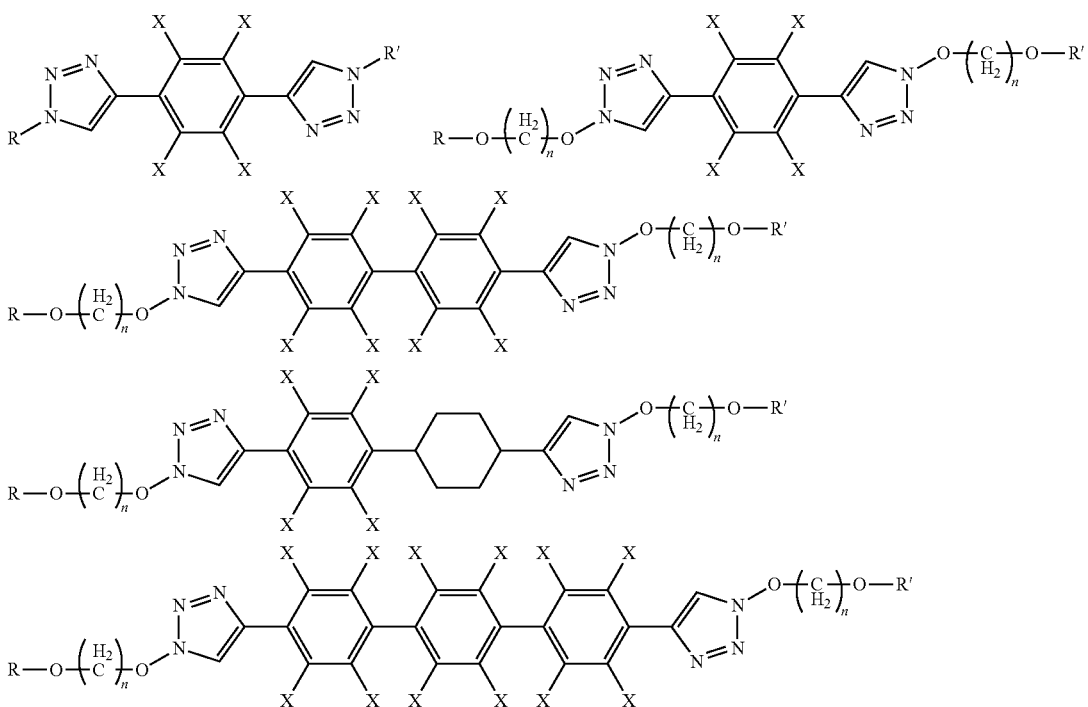

-continued

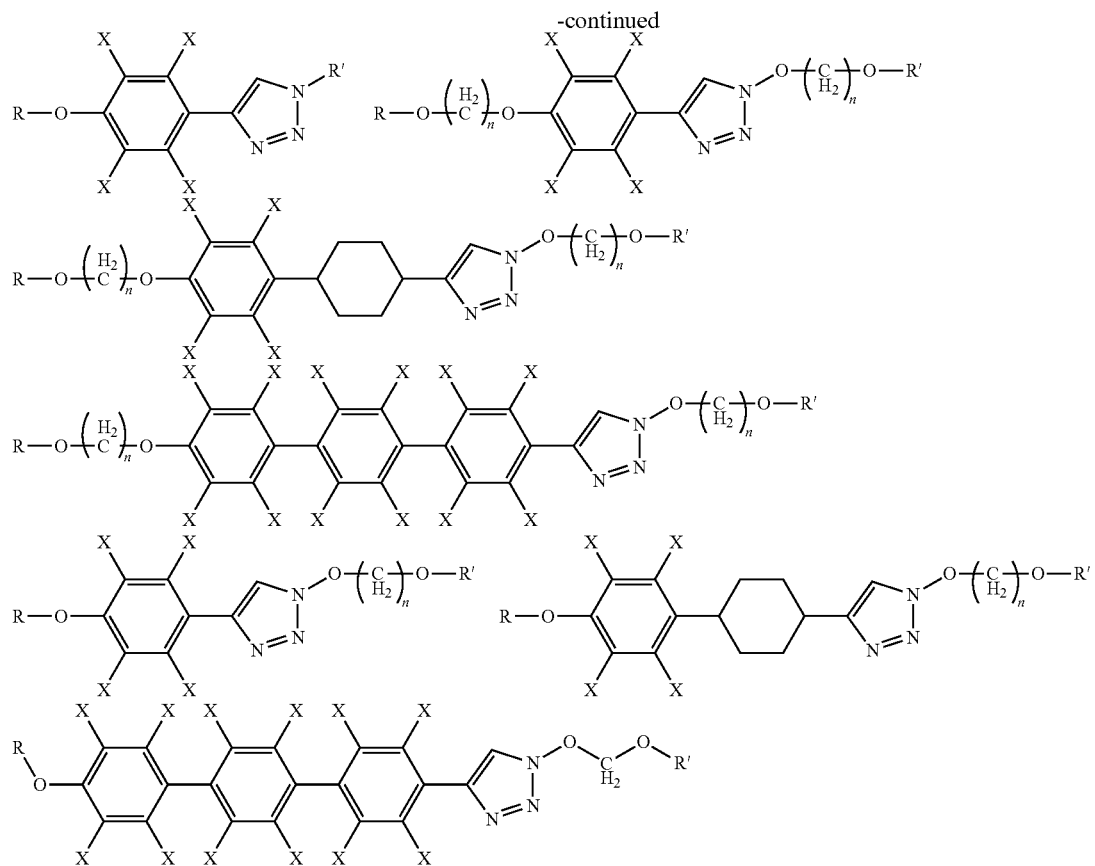

where X is a substituent selected from the group consisting of H, CH3, (CH2)pCH3 (where p is an integer from 1 to 20), F, Br, I, OH, C3H7, NH2 and CN, and n is an integer from 1 to 20, and R and R' are independently selected from the group consisting of the substituents represented by the following Formula 4:

[Formula 4]

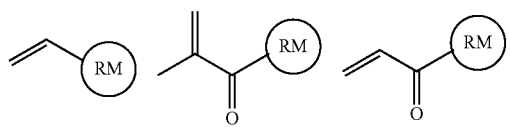

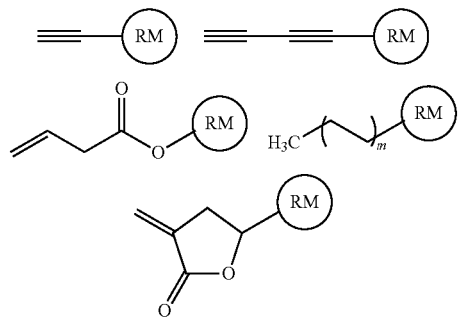

where m is an integer from 1 to 20, and ⓇⓂ denotes an attachment point for a remainder of the reactive mesogen.

22. The fabrication method of a display device as claimed in claim 20, the vertically aligning diamine being selected from the group consisting of the compounds represented in the following Formula 5:

[Formula 5]

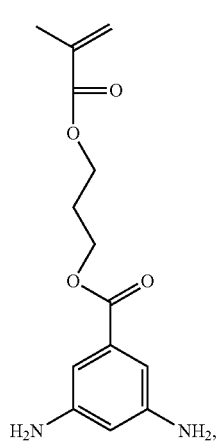

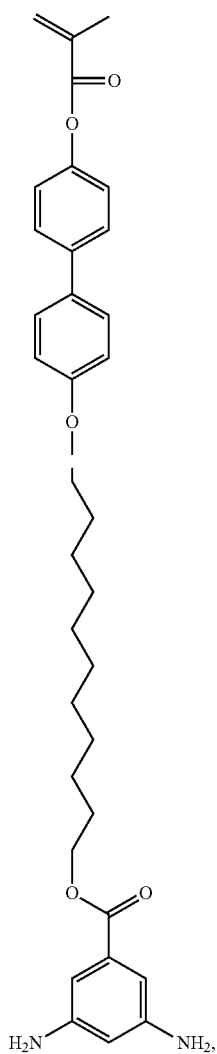

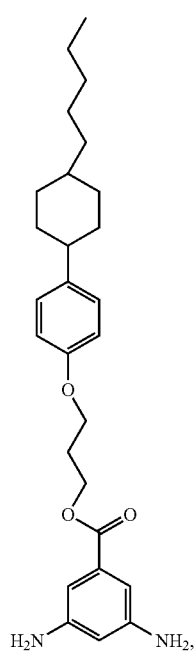

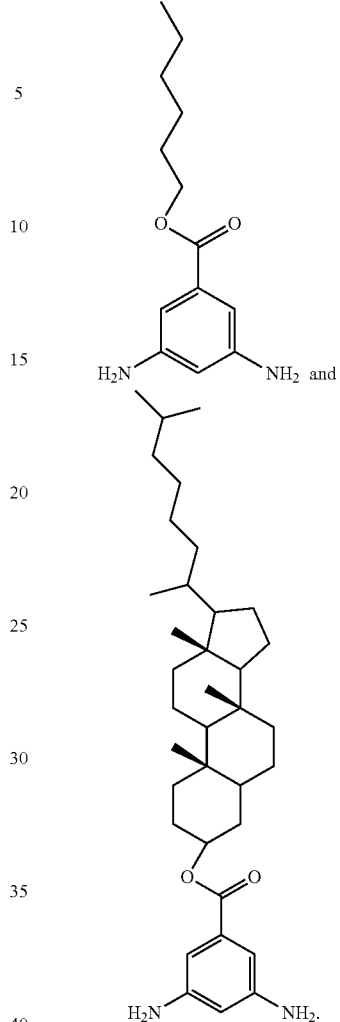

23. The fabrication method of a display device as claimed in claim 20, the curing step further comprising:
pre-curing the alignment solution at a first temperature; and
main curing the pre-cured alignment solution at a second temperature higher than the first temperature.

24. The fabrication method of a display device as claimed in claim 20, the using step further comprising:
providing the liquid crystal composition on at least one of the first substrate and the second substrate;
providing an encapsulating solution on at least one of the first substrate and the second substrate;
facing the first substrate and the second substrate with the liquid crystal composition therebetween; and
curing the encapsulating solution.

25. The fabrication method of a display device as claimed in claim 20, the curing of the alignment solution to form the main alignment layer comprising forming a main alignment layer including a plurality of side chains.

26. The fabrication method of a display device as claimed in claim 20, the method further comprising:
providing light to perform reaction between at least a portion of the side chains and the reactive mesogen to connect the at least a portion of the side chains to each other through the reactive mesogen.

27. The fabrication method of a display device as claimed in claim 20, further comprising:
exposing the liquid crystal layer to a first light while applying an electric field to the liquid crystal layer;
removing the electric field; and
exposing the liquid crystal layer to a second light.

28. The fabrication method of a display device as claimed in claim 20, the reactive mesogen included in the liquid crystal composition being included in an amount ratio from about 0.01 to about 10 wt % based on an amount of the liquid crystal composition.

\* \* \* \* \*